US008936322B2

(12) United States Patent
Klimes et al.

(10) Patent No.: US 8,936,322 B2
(45) Date of Patent: Jan. 20, 2015

(54) BRAKE SYSTEM WITH SELECTOR VALVE FOR SELECTING BETWEEN TWO MODES OF OPERATION

(75) Inventors: Milan Klimes, Niles, MI (US); Timothy J. Albert, Niles, MI (US); Gregory P. Goodzey, South Bend, IN (US); Kevin Johnson, Granger, IN (US); Kenneth S. Towers, Granger, IN (US)

(73) Assignee: Robert Bosch GmbH, Stuttgart (DE)

( * ) Notice: Subject to any disclaimer, the term of this patent is extended or adjusted under 35 U.S.C. 154(b) by 755 days.

(21) Appl. No.: 12/763,833

(22) Filed: Apr. 20, 2010
(Under 37 CFR 1.47)

(65) Prior Publication Data
US 2011/0254360 A1 Oct. 20, 2011

(51) Int. Cl.
| B60T 13/74 | (2006.01) |
| B60T 13/66 | (2006.01) |
| B60T 7/04 | (2006.01) |
| B60T 7/20 | (2006.01) |
| B60T 8/40 | (2006.01) |
| B60T 13/68 | (2006.01) |
| B60T 8/42 | (2006.01) |

(52) U.S. Cl.
CPC .............. *B60T 13/662* (2013.01); *B60T 7/042* (2013.01); *B60T 7/20* (2013.01); *B60T 8/4081* (2013.01); *B60T 13/686* (2013.01)
USPC ........... 303/3; 303/15; 303/113.4; 303/119.1; 303/117.1

(58) Field of Classification Search
USPC ................. 303/3, 5, 15, 122, 122.04, 122.09, 303/113.3, 113.4, 115.1, 115.2, 116.2, 303/117.1, 119.1, 119.2
See application file for complete search history.

(56) References Cited

U.S. PATENT DOCUMENTS

| 5,026,123 | A | * | 6/1991 | Nokubo et al. ............ 303/117.1 |
| 5,036,665 | A | | 8/1991 | Brown |
| 5,720,170 | A | | 2/1998 | Hageman et al. |
| 6,135,575 | A | * | 10/2000 | Feigel et al. ................ 303/113.4 |
| 6,267,456 | B1 | | 7/2001 | Crombez |
| 6,315,370 | B1 | * | 11/2001 | Feigel et al. ................ 303/115.2 |
| 6,318,703 | B1 | * | 11/2001 | Goossens et al. ......... 251/129.15 |
| 6,364,436 | B1 | * | 4/2002 | Sawada .......................... 303/191 |
| 6,604,795 | B2 | * | 8/2003 | Isono et al. ..................... 303/11 |
| 7,651,176 | B2 | * | 1/2010 | Inoue et al. ................ 303/114.1 |
| 2003/0160504 | A1 | | 8/2003 | Chris |
| 2008/0079309 | A1 | * | 4/2008 | Hatano et al. .............. 303/113.5 |

* cited by examiner

*Primary Examiner* — Melody Burch
(74) *Attorney, Agent, or Firm* — Maginot Moore & Beck LLP

(57) ABSTRACT

A system for use in a vehicle with a brake pedal and a brake circuit. The system includes a master cylinder assembly configured to pressurize fluid therein in response to movement of the brake pedal, a sensor assembly configured to generate a pedal position signal indicative of position of the brake pedal, an electronic control unit configured to (i) generate a brake request signal in response to generation of the pedal position signal, and (ii) generate a selector control signal, and a selector valve assembly being moved from a first mode to a second mode in response to generation of the selector control signal, the master cylinder assembly is (i) isolated from fluid communication with the brake circuit when the selector valve assembly is positioned in the first mode, and (ii) in fluid communication with the brake circuit when the selector valve assembly is positioned in the second mode.

15 Claims, 20 Drawing Sheets

BRAKE SYSTEM WITH SELECTOR VALVE FOR SELECTING BETWEEN TWO MODES OF OPERATION

FIELD

The present invention relates generally to a brake system for a vehicle, and particularly to a brake system that is operable in an active mode and a conventional mode.

BACKGROUND

Major developments have taken place in vehicular braking systems in recent years. Among these developments are anti-lock braking systems (ABS) and regenerative braking systems used in electric and hybrid-electric systems. In regenerative braking systems, a vehicle's brake pedal is mechanically decoupled from the downstream braking circuits. Sensors associated with the brake pedal provide electrical signals to an electronic control unit (ECU). These signals are representative of the brake pedal position. Since the brake pedal is mechanically decoupled from the downstream braking circuits, a brake pedal feel simulator is often used to simulate the feel of a conventional braking system by providing pressure feedback to the vehicle operator at the brake pedal. The force of the brake pedal is transferred to the brake pedal feel simulator. Meanwhile, the ECU controls the braking system to apply a braking force consistent with the brake pedal position. An electrical regenerative system and/or a hydraulic system provide the necessary braking force.

In the event of a failure of the hydraulic system or the electrical regenerative system, it will become necessary for the braking system to switch its mode of operation so that the brake pedal is mechanically coupled to the downstream brake circuits. In its changed mode, the force applied to the brake pedal would be transferred to the downstream brake circuits to generate the necessary braking force to halt a vehicle.

Therefore, there is a need to provide an improved braking system that is operable in a conventional mode in which a brake pedal is mechanically decoupled from the downstream braking circuits and a fallback mode in which the brake pedal is mechanically coupled to the downstream braking circuits.

SUMMARY

According to one embodiment of the present disclosure, there is provided a system for use in a vehicle with a brake pedal and a brake circuit. The system includes a master cylinder assembly configured to pressurize fluid therein in response to movement of the brake pedal. The system also includes a sensor assembly configured to generate a pedal position signal indicative of position of the brake pedal. Further the system includes an electronic control unit configured to (i) generate a brake request signal in response to generation of the pedal position signal, and (ii) generate a selector control signal. The system also includes a selector valve assembly operable in a first mode and a second mode, the selector valve assembly being moved from the first mode to the second mode in response to generation of the selector control signal. Furthermore the system includes a pedal feel simulator (i) in fluid communication with the master cylinder when the selector valve assembly is positioned in the first mode, and (ii) isolated from fluid communication with the master cylinder when the selector valve assembly is positioned in the second mode. The system also includes a booster actuator configured to generate force in response to generation of the brake request signal, and a booster assembly configured to pressurize fluid therein in response to generation of force by the booster actuator. The master cylinder assembly is (i) isolated from fluid communication with the brake circuit when the selector valve assembly is positioned in the first mode, and (ii) in fluid communication with the brake circuit when the selector valve assembly is positioned in the second mode. Further, the booster assembly is (i) in fluid communication with the brake circuit when the selector valve assembly is positioned in the first mode, and (ii) isolated from fluid communication with the brake circuit when the selector valve assembly is positioned in the second mode.

BRIEF DESCRIPTION OF THE DRAWINGS

The above described features and advantages, as well as others, will become more readily apparent to those of ordinary skill in the art by reference to the following detailed description and accompanying drawings.

DETAILED DESCRIPTION

Figure 1:
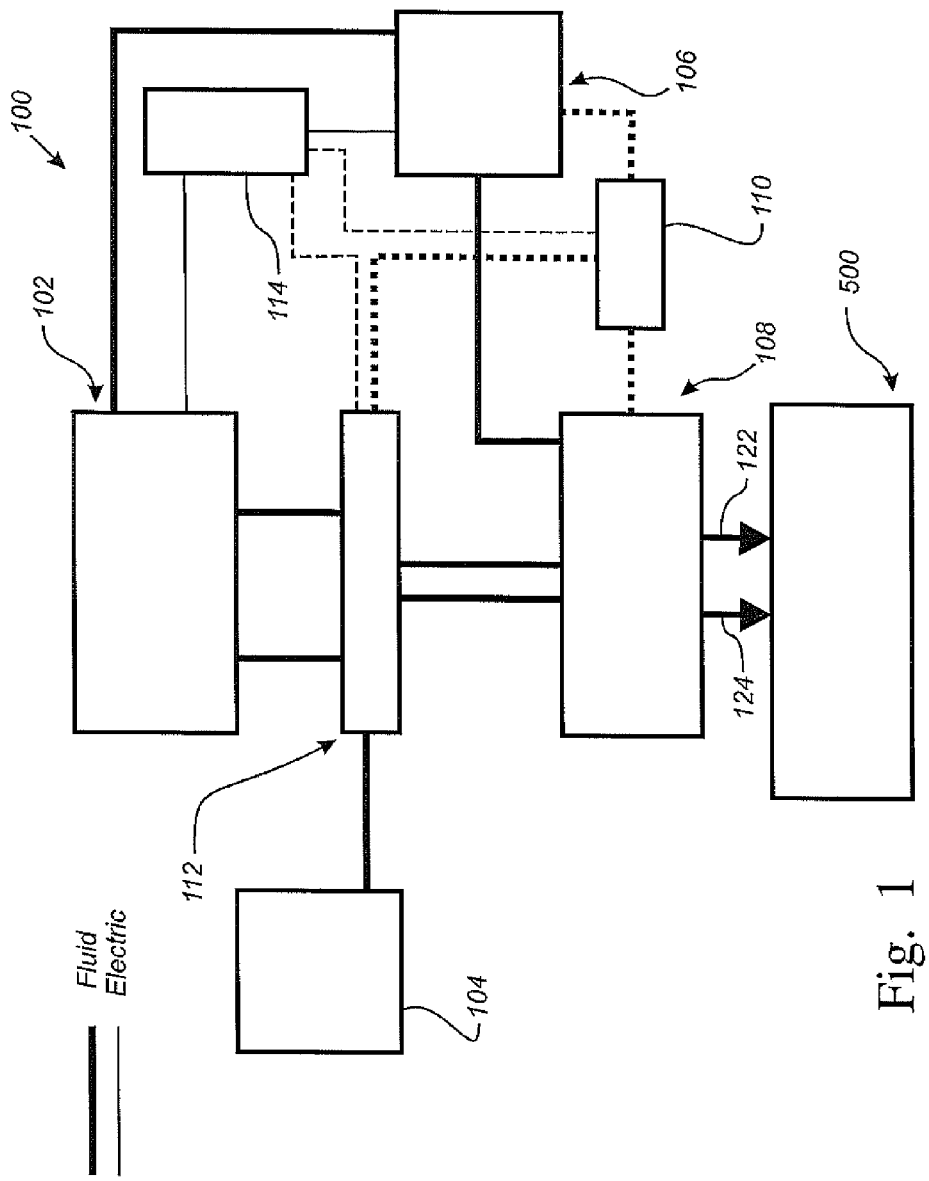
FIG. 1 depicts a block diagram schematic of a braking system of the present disclosure.

For the purpose of promoting an understanding of the principles of the invention, reference will now be made to the embodiments illustrated in the drawings and described in the following written description. It is to be understood that no limitation to the scope of the invention is thereby intended. It is further to be understood that the present invention includes any alterations and modifications to the illustrated embodiments and includes further applications of the principles of the invention as would normally occur to one skilled in the art to which this invention pertains.

Referring to FIG. 1, there is depicted a block diagram schematic of a braking system 100. The braking system 100 includes a master cylinder assembly 102, a brake pedal feel simulator 104, a reservoir 106, a booster assembly 108, a booster actuator 110, a selector valve 112, an electronic control unit (ECU) 114. The booster actuator 110 includes an electric motor and a screw gear (not shown) for actuating the booster assembly 108. In an alternative embodiment, the booster actuator 110 may include a fluid pump station for providing a source of high pressure fluid which includes a motor, a pump, and a high pressure reservoir (not shown) for actuating the booster actuator. In FIG. 1, thin lines indicate electrical lines, while the thicker lines indicate fluid lines. The master cylinder assembly 102 contains a sensor (FIG. 3) which is used to relay information about position of a brake pedal (FIG. 2) to the ECU 114. The master cylinder assembly 102 is fluidly coupled to the selector valve 112 and is also fluidly coupled to the reservoir 106. The selector valve 112 is electrically coupled to the ECU 114 so that the ECU 114 can energize a solenoid (FIG. 4) of the selector valve for switching the selector valve from a first mode to a second mode. Alternatively the selector valve 112 is fluidly coupled to the fluid pumping station of the booster actuator 110 or another high pressure fluid source for switching the selector valve 112 from the first mode to the second mode. The selector valve 112 is also fluidly coupled to the brake pedal feel simulator 104. In addition, the selector valve 112 is fluidly coupled to the booster assembly 108, which in turn is coupled to the booster actuator 110. The booster assembly 108 is fluidly coupled to the downstream brake circuits 500 (see FIG. 2A) by fluid lines 122 and 124. In an alternative embodiment, the selector valve 112 is coupled to the downstream brake circuits 500 (See FIG. 9).

Figure 2:
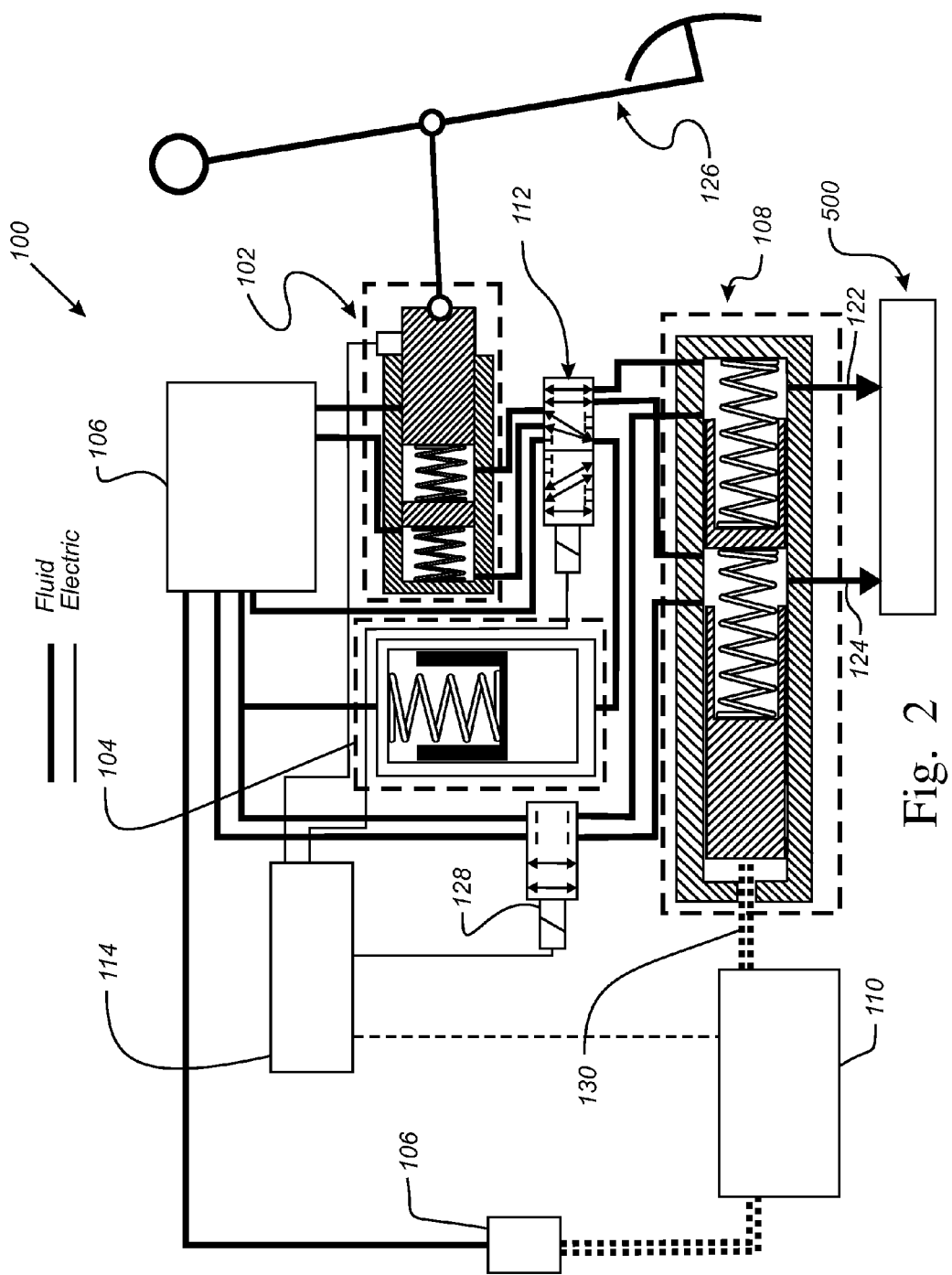
FIG. 2 depicts a more detailed schematic of the braking system of FIG. 1 including a master cylinder, a selector valve, a booster actuator, and a booster assembly.
Figure 2A:
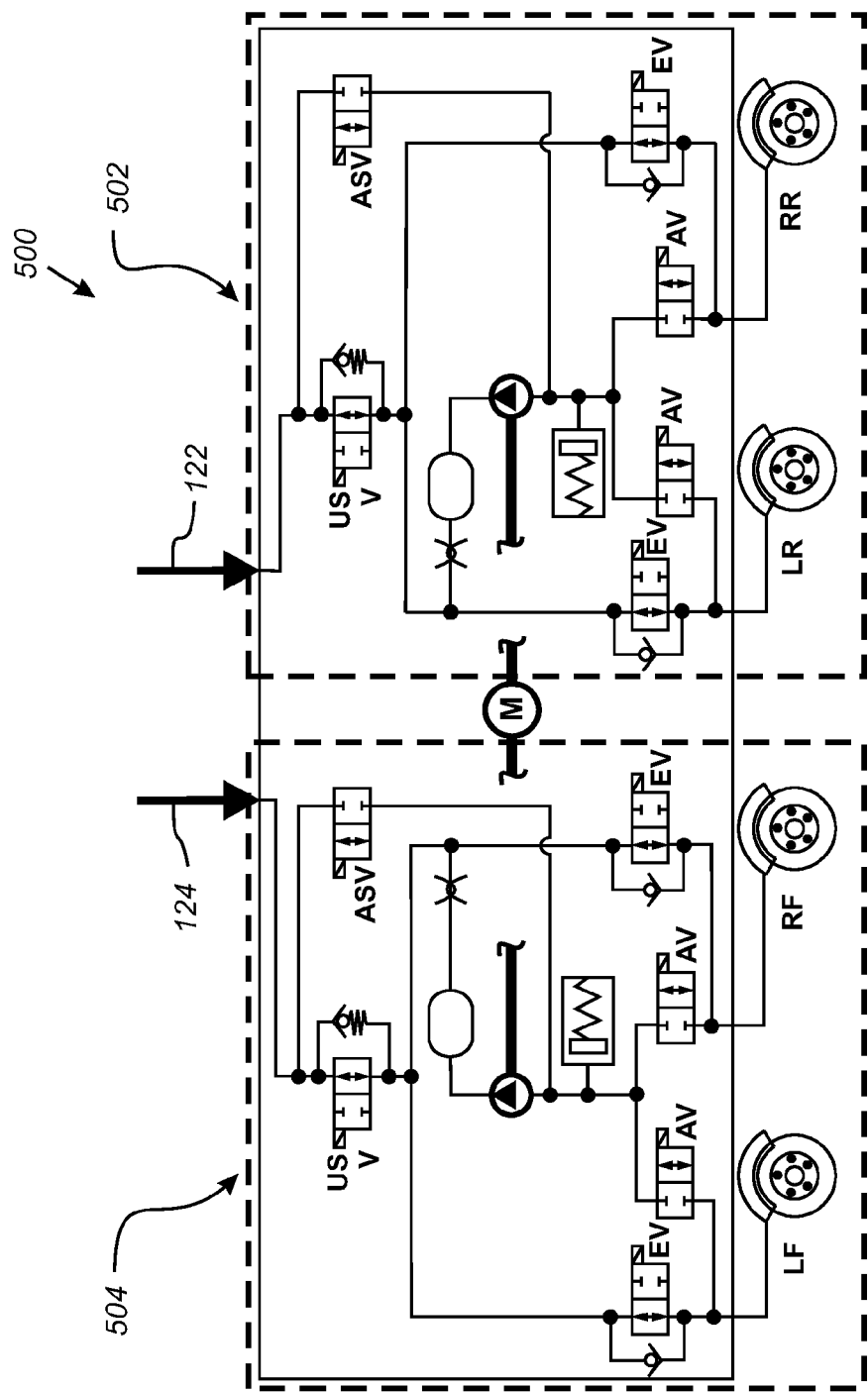
FIG. 2A is a schematic of the downstream braking circuits of FIG. 1.

Referring to FIG. 2, there is shown a more detailed schematic of the braking system 100 of FIG. 1. The braking system 100 further includes the brake pedal 126. In FIG. 2, the thin lines indicate electrical lines, while the thicker lines indicate hydraulic lines. Hydraulic lines 122 and 124 provide pressurized hydraulic fluid to downstream brake circuits 500 as shown in FIG. 2A. FIG. 2A shows a schematic of the downstream braking circuits 500 which includes a first downstream braking circuit 502 and a second downstream braking circuit 504. The fluid line 122 provides a high pressure fluid coupling to the first downstream braking circuit 502. The fluid line 124 provides a high pressure fluid coupling to the second downstream braking circuit 504.

The reservoir 106 is fluidly coupled to the master cylinder assembly 102. The master cylinder 102 is also fluidly coupled to the selector valve 112. The selector valve 112 is fluidly coupled to the brake pedal feel simulator 104. The selector valve 112 is also fluidly coupled to the booster assembly 108. The booster assembly 108 is fluidly coupled to the reservoir 106. The coupling of the booster assembly 108 to the reservoir 106 is via a valve assembly 128 which provides selective coupling between the booster assembly 108 and the reservoir 106. The booster assembly is also fluidly coupled to the downstream brake circuits 500 via the fluid lines 122 and 124. The ECU 114 is electrically coupled to the master cylinder assembly 102, the booster actuator 110, the selector valve 112, and the valve assembly 128.

Figure 2B:
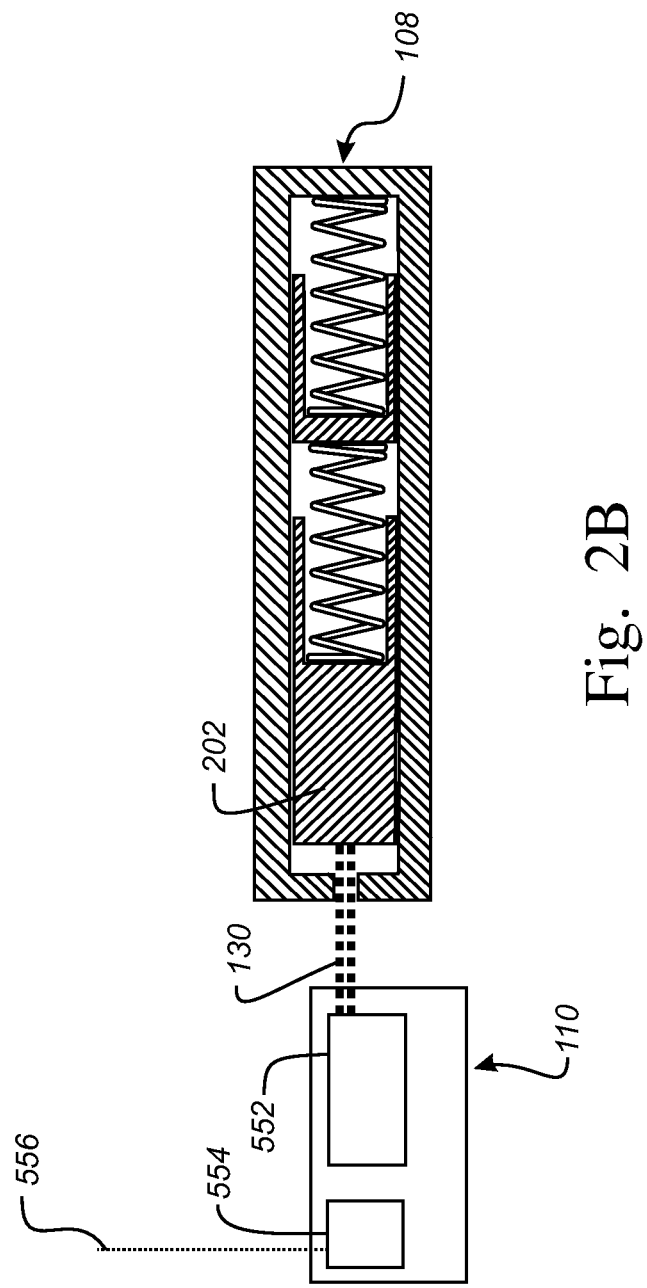
FIG. 2B is a schematic of the booster actuator of FIG. 2.

The booster actuator 110 is configured to provide a force to the booster assembly 108. The booster actuator 110 is coupled to a piston 202 of the booster assembly 108, as shown in FIG. 2B. Referring to FIG. 2B, the booster actuator 110 is shown which includes an electric motor 552 in communication with a drive circuit 554 which is coupled to the ECU 114 by an electrical line 556. Preferably, the electric motor 552 is a stepper motor. A coupling 130 is depicted in FIG. 2B by a dotted line. The coupling 130 is a screw-type member coupling the electric motor 552 with the piston 202 of the booster assembly 108 via a ball screw gear mechanism.

Figure 2C:
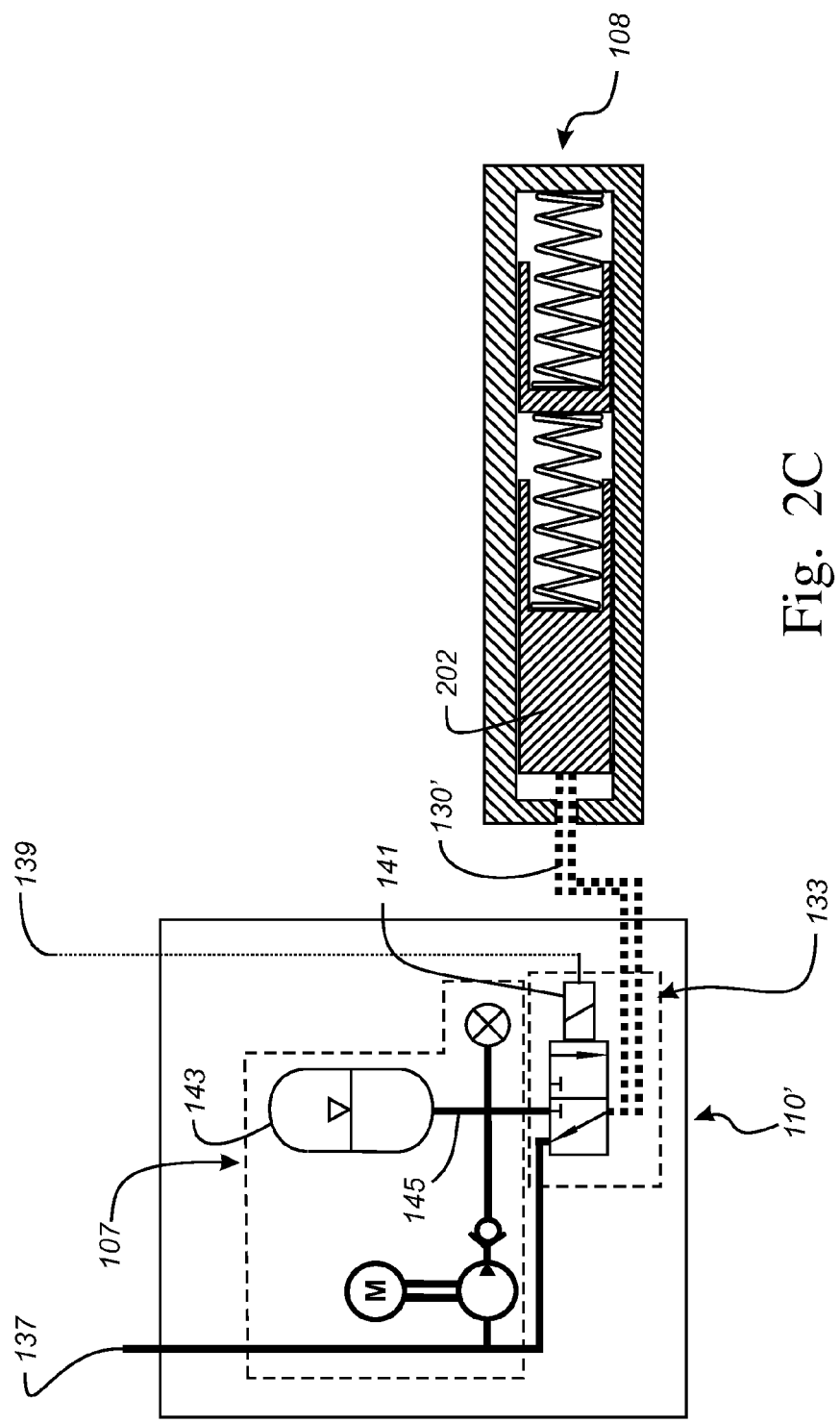
FIG. 2C is a schematic of an alternative embodiment of the booster actuator of FIG. 2 including a valve assembly.

In an alternative embodiment shown in FIG. 2C, the booster actuator 110' includes a fluid pumping station 107 and a valve assembly 133. The fluid pumping station 107 includes a motor, a pump, a check valve, and a high pressure reservoir 143 for pressurizing hydraulic fluid in the fluid pumping station 107. The valve assembly 133 is fluidly coupled to the piston 202 of the booster assembly 108 to provide a force to the piston 202. The valve assembly 133 is also coupled to the reservoir 106 via the hydraulic line 137. Further, the valve assembly 133 is fluidly coupled to the high pressure reservoir 143 via a fluid line 145. The hydraulic line 137 is also coupled to the fluid pumping station 107. The valve assembly 133 can selectively couple the fluid pumping station 107 with the piston 202 of the booster assembly 108. The valve assembly 133 is controlled by the ECU 114 via an electric line 139 which is connected to a solenoid valve 141. The coupling 130' in FIG. 2C is a fluid coupling. Since the booster actuator 110 can be electromechanically coupled to the booster assembly 108, as shown in FIG. 2B, or fluidly coupled to the booster assembly 108, as shown in FIG. 2C, the electric lines 556 and 139 between the booster actuator 110 and 110' and the ECU 114 are depicted as dotted lines. Also, the coupling 130/130' between the booster actuator 110/110' and the booster assembly 108, shown in FIGS. 2B and 2C, are depicted as dotted lines. Also, since the coupling 130 can be a mechanical coupling (screw) or a fluid coupling it is depicted as a dotted line. The coupling 130/130' in FIGS. 2B and 2C are shown in double dotted lines to signify the high mechanical force or high pressure fluid coupling between the booster actuator 110/110' and the booster assembly 108.

Figure 2D:
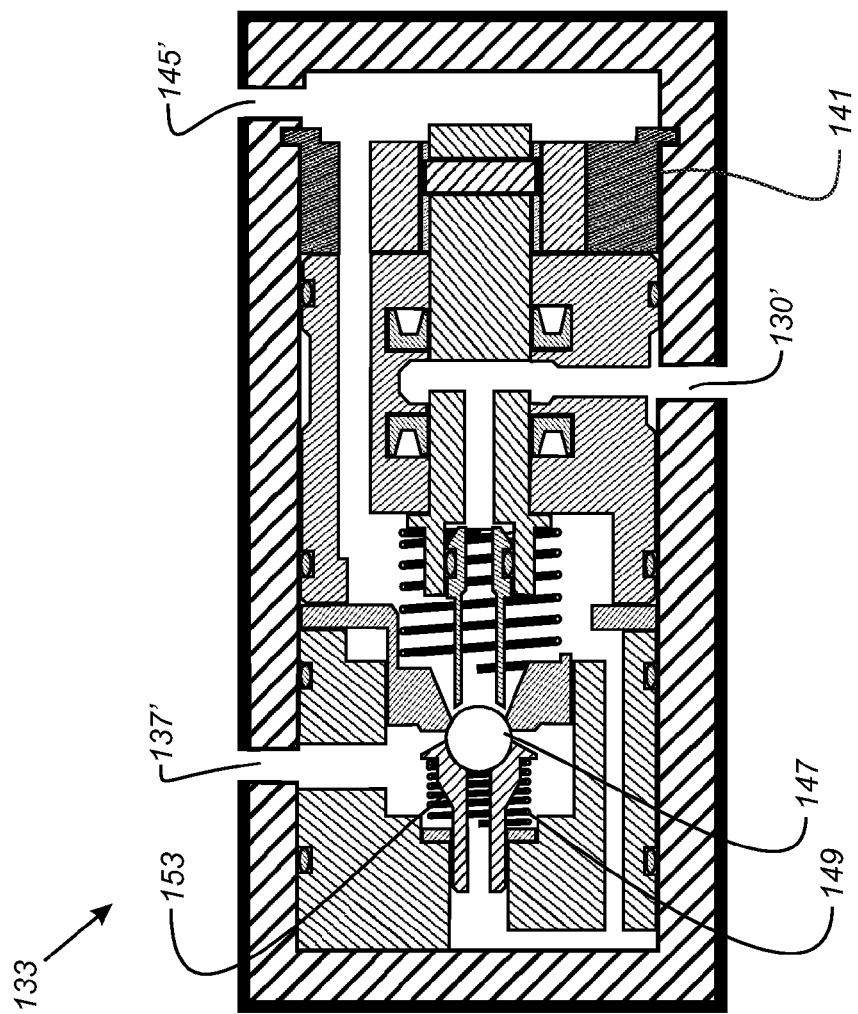
FIG. 2D is a schematic of the valve assembly of FIG. 2C.

Referring to FIG. 2D, an example of a schematic of the valve assembly 133 is depicted. The valve assembly 133 has inlets 137' and 145' which are fluidly coupled to fluid lines 137 and 145 which are fluidly coupled to the reservoir 106 and to the high pressure fluid reservoir 143, respectively. The valve assembly 133 also has a valve mechanism which includes a ball 147, a spring 149, and a valve seat 153.

Figure 3:
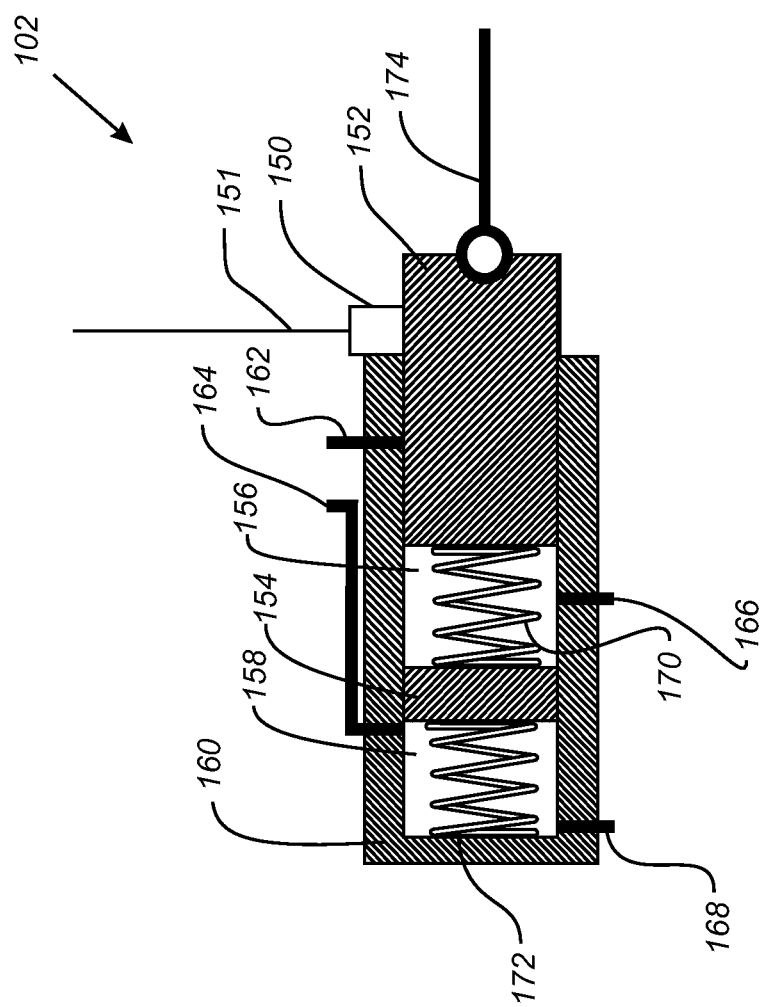
FIG. 3 depicts a cross sectional view of the master cylinder of FIG. 2.

Referring to FIG. 3, the master cylinder assembly 102 is depicted. The master cylinder assembly 102 includes a sensor assembly 150 configured to generate an electrical signal on line 151 corresponding to the position of the brake pedal 126. The line 151 is connected to the ECU 115 so that the ECU 114 receives the electrical signal. Also depicted in FIG. 3 are pistons 152 and 154, a chamber 156 formed between the pistons 152 and 154, a chamber 158 formed between the piston 154 and a housing 160, a fluid channel 162 in fluid communication between the reservoir 106 and the chamber 156, a fluid channel 164 in fluid communication between the reservoir 106 and the chamber 158, an outlet 166 in fluid communication with the chamber 156, an outlet 168 for fluid communication with the chamber 158, a biasing element 170 located between the pistons 152 and 154 within the chamber 156, a biasing element 172 located between the piston 154 and the housing 160 within the chamber 158, and a brake pedal connecting rod 174 coupling the piston 152 to the brake pedal 126.

Figure 4:
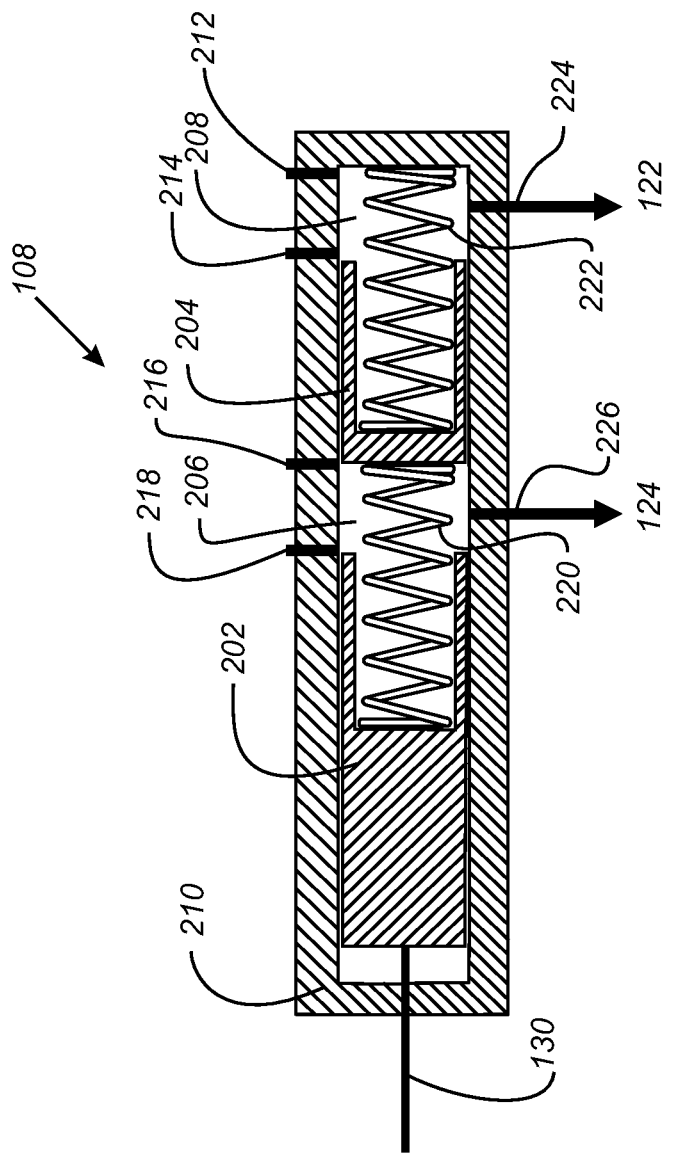
FIG. 4 depicts a cross sectional view of the booster assembly of FIG. 2.

Referring to FIG. 4, the booster assembly 108 is depicted. The booster assembly 108 includes pistons 202 and 204, a chamber 206 located between the pistons 202 and 204, a chamber 208 located between the piston 204 and a housing 210, an inlet 212 in fluid communication with the chamber 208, an inlet 214 in fluid communication with the chamber 208, an inlet 216 in fluid communication with the chamber 206, an inlet 218 in fluid communication with the chamber 206, a biasing element 220 located between the pistons 202 and 204 within the chamber 206, a biasing element 222 located between the piston 204 and the housing 210 within the chamber 208, an outlet 224 in fluid communication between the chamber 208 and the first brake circuit 502, and an outlet 226 in fluid communication between the chamber 206 and the second brake circuit 504. The outlets 224 and 226 are fluidly coupled to the fluid lines 122 and 124, respectively.

Figure 5:
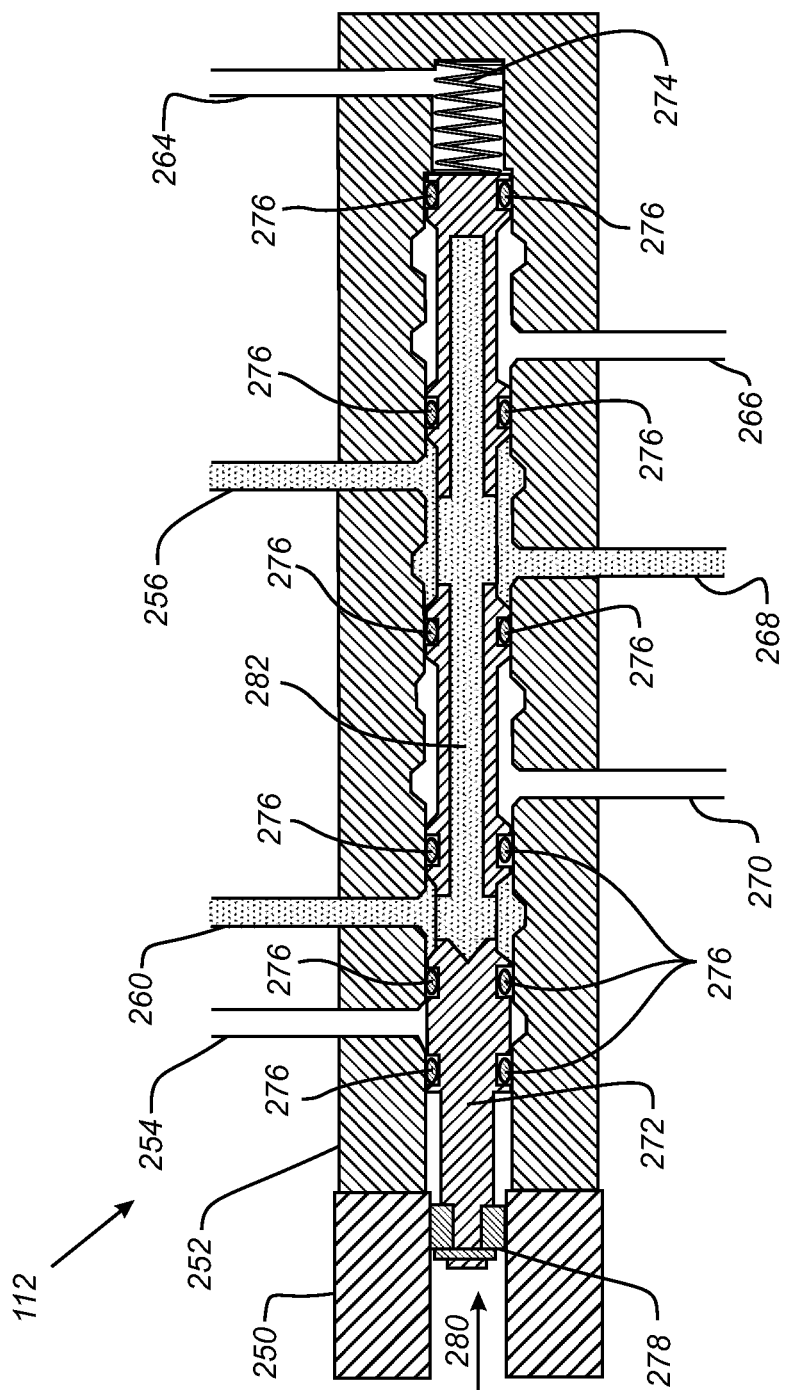
FIG. 5 depicts a cross sectional view of the selector valve of FIG. 2 including a solenoid shown in an actuated position.

Referring to FIG. 5, the selector valve 112 is depicted in further detail. The selector valve 112 includes a solenoid 250, a housing 252, inlets 254, 256, 260, and 264, outlets 266, 268, 270, a shaft 272, a biasing member 274 in the form of a spring disposed between the shaft 272 and the housing 252, seals 276, and a coil 278 coupled to the shaft 272. The selector valve 112 is depicted in FIG. 5 as being in an actuated position, i.e., electrical current is applied to the solenoid 250 causing the coil 278 and the shaft 272 to move to the right in the direction of an arrow 280. In the actuated position, the selector valve 112 places the outlets 166 and 168 of the master cylinder assembly 102 in fluid communications with the brake pedal feel simulator 104. This position constitutes a first mode of operation, which is hereinafter referred to as the active mode. The shaft 272 has a hollow section 282 which allows hydraulic fluid to travel through the center of the shaft 272. In this position, fluid can travel from inlets 256 and 260, through the hollow section 282, and through the outlet 268. The dots inside the aforementioned path in FIG. 5 indicate presence of pressurized hydraulic fluid. The inlets 256 and 260 are connected to the outlets 166 and 168 of the master cylinder assembly 102, respectively as shown in FIG. 2. Fluid that is ejected through the outlets 166 and 168 of the master cylinder assembly 102 travel through the inlets 256 and 260, through the hollow section 282 of the shaft 272 and unite in the outlet 268. The outlet 268 is fluidly connected to the brake pedal feel simulator 104, as shown in FIG. 2. The inlets 254 and 264 are coupled to the reservoir 106 via one way valves to provide pressure relief when the solenoid 250 is de-energized.

Figure 6:
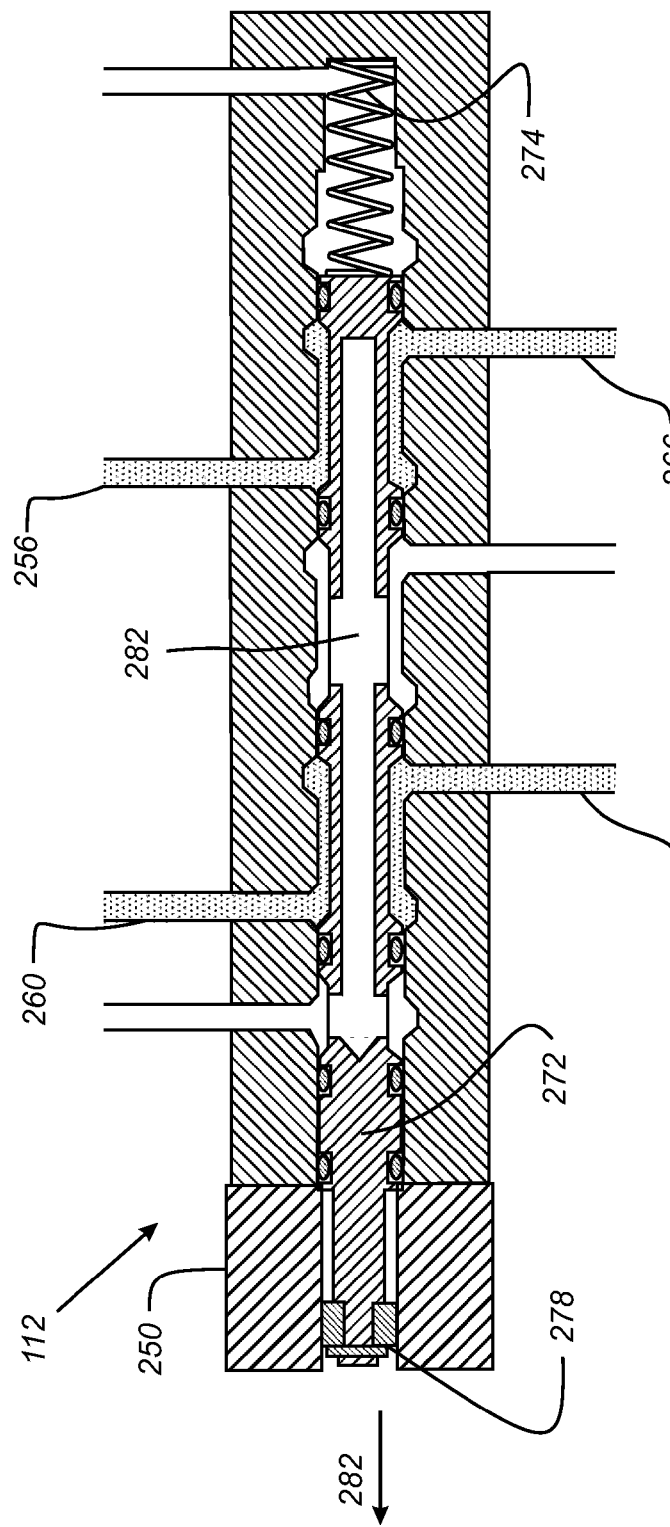
FIG. 6 depicts the selector valve of FIG. 5 with the solenoid shown in a de-actuated position.

FIG. 6 shows the selector valve 112 positioned in a de-actuated position, i.e., electrical current is not applied to the solenoid 250. The biasing member 274 causes the coil 278 and the shaft 272 to move to the left in the direction of an arrow 282, relative to its position in FIG. 5. In the de-actuated position, the selector valve 112 couples the outlets 166 and 168 of the master cylinder assembly 102 to the inlets 212 and 216 of the booster assembly 108, respectively. This position constitutes a second mode of operation, which is hereinafter referred to as the conventional mode. In this position, pressurized fluid can travel from inlets 256 and 260 and through the outlets 266 and 270. The dots inside the aforementioned path in FIG. 6 indicate presence of pressurized hydraulic fluid. The inlets 256 and 260 are fluidly connected to outlets 166 and 168 of the master cylinder assembly 102, respectively. Fluid that is ejected through the outlets 166 and 168 of the master cylinder assembly 102 travel through the inlets 256 and 260, and through outlets 266 and 270. The outlets 266 and 270 are connected to the inlets 212 and 216 of the booster assembly 108. In the conventional mode, the hollow section 282 of the shaft 272 is isolated from fluid communication with the master cylinder assembly 102.

Figure 7:
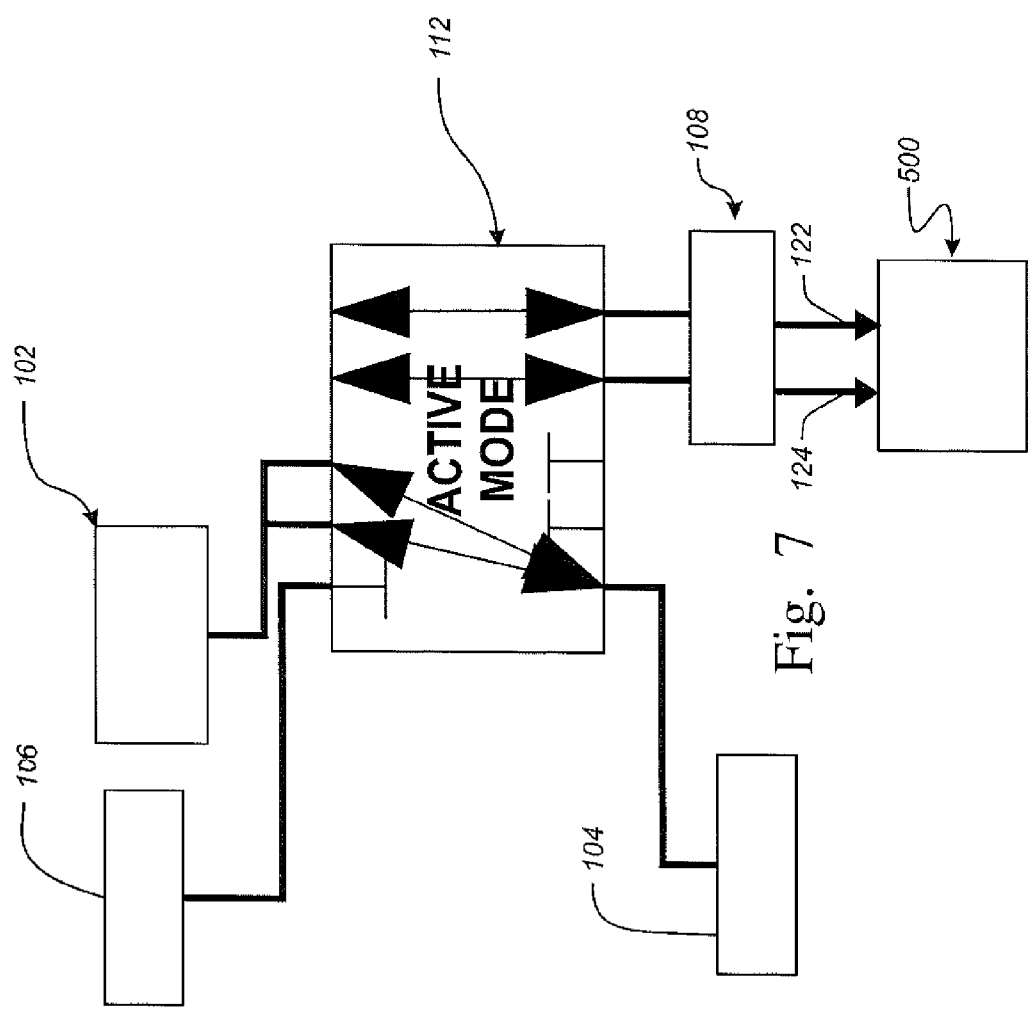
FIG. 7 depicts a schematic of the selector valve of FIG. 2 shown in a first mode.

Referring to FIG. 7, a schematic of the selector valve 112 and surrounding components is depicted with the selector valve 112 positioned in the active mode. The selector valve 112 is depicted with fluid connections showing operations in the active mode in which the master cylinder assembly 102 is in fluid communication with the brake pedal feel simulator 104, but is fluidly isolated from the brake circuits 500. Further, in the active mode, the booster assembly 108 is in fluid communication with the downstream brake circuits 500, but is fluidly isolated from the master cylinder assembly 102. In the active mode, the selector valve 112 is also fluidly coupled to the reservoir 106.

Figure 8:
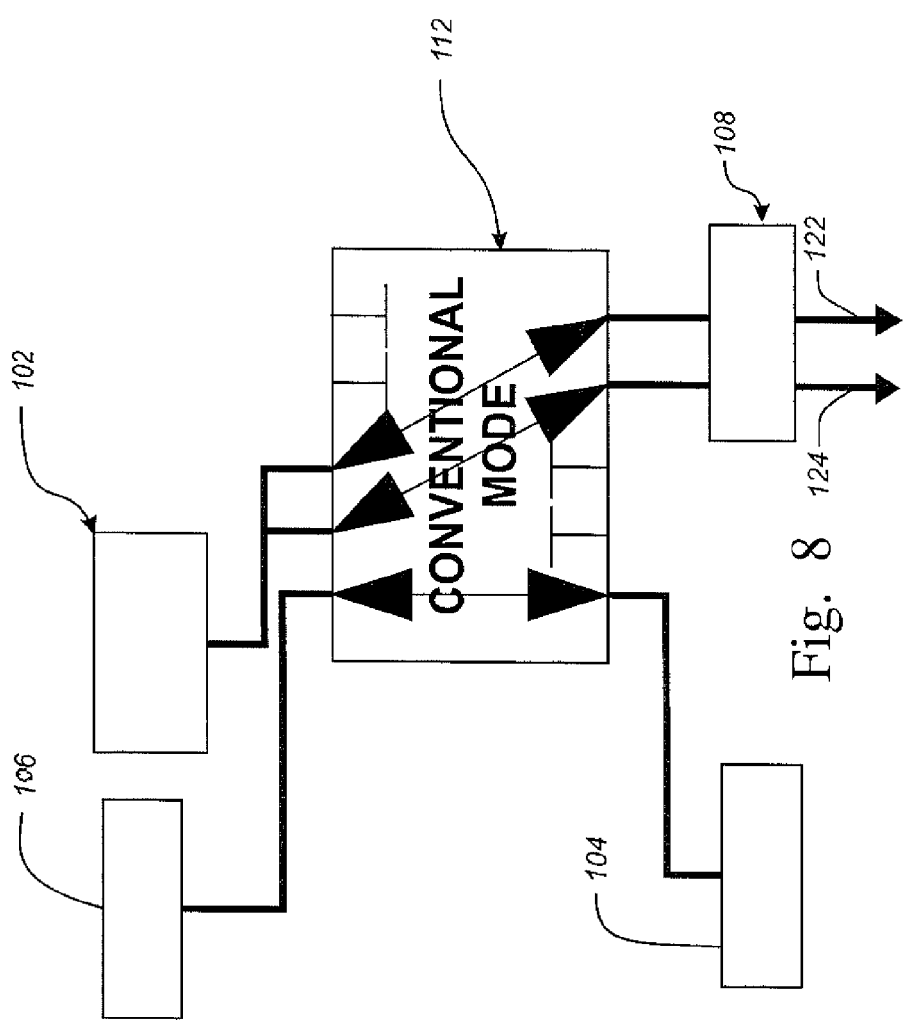
FIG. 8 depicts a schematic of the selector valve of FIG. 2 shown in a second mode.

Referring to FIG. 8, a schematic of the selector valve 112 and surrounding components is depicted with the selector valve positioned in the conventional mode. The selector valve 112 is depicted with fluid connections showing operations in the conventional mode in which the master cylinder assembly 102 is in fluid communication with the downstream brake circuits 500 through the selector valve 112 and the booster assembly 108 via fluid lines 122 and 124. In the conventional mode, the selector valve is also fluidly coupled to the reservoir 106.

In operation, the ECU 114 determines the mode of the selector valve 112, i.e., active or conventional. The ECU is configured to make this decision based on the fluid pressure and other diagnostic information, as is well known to one skilled in the art. The ECU generates a selector signal that is used to place the selector valve 112 in one of the two modes. In the active mode, the brake pedal 126 is mechanically decoupled from the downstream brake circuits 500. When the brake pedal 126 is in a rest position, i.e., no pressure is being applied to the brake pedal 126 by the vehicle operator, the chambers 156 and 158 of the master cylinder assembly 102 are fluidly coupled to the reservoir 106 through inlets 162 and 164, respectively. In this position, no appreciable fluid pressure exists in the chambers 156 and 158. As the brake pedal 126 is pressed by the vehicle operator, the pistons 152 and 154 of the master cylinder assembly 102 travel and thereby seal the inlets 162 and 164. Once the inlets 162 and 164 are completely cut off from fluid communication with the chambers 156 and 158, these chambers are now only fluidly coupled to the selector valve inlets 256 and 260, the hollow section 282 of the shaft 272, the outlet 268, the brake pedal feel simulator 104 and the fluid lines there between. Therefore, continued depression of the brake pedal 126 raises the pressure inside the aforementioned path. The brake pedal feel simulator 104 provides a resistance to the brake pedal 126 similar to a conventional braking system (e.g., a resistance similar to that experienced by the vehicle operator when the selector valve is positioned in the conventional mode).

Furthermore, in the active mode the combination of seals 276, the shaft 272, and the housing 252 of the selector valve 112 prevents any appreciable fluid communication between the master cylinder assembly 102 and the booster assembly 108. Therefore, the master cylinder assembly 102 is isolated from fluid communication with the booster assembly 108 when the selector valve is positioned in the active mode.

While the brake pedal 126 is in a rest position, i.e., no pressure being applied by the vehicle operator, the chambers 206 and 208 are in fluid communication with the reservoir 106 via the valve assembly 128. The valve assembly 128 can be a normally closed valve assembly, thereby requiring energization of its solenoid in order to establish fluid coupling between its inlets and outlets. Therefore, while the brake pedal 126 is in the rest position, the valve assembly 128 can be intermittently energized in order to maintain fluid coupling between the chambers 206 and 208 and the reservoir 106. Once the brake pedal 126 is pressed by the vehicle operator, the connection between the chambers 206 and 208 and the reservoir 106 is terminated by de-energizing the valve assembly 128.

When the booster actuator 110 is actuated, fluid pressure inside the chambers 206 and 208 begin to rise. The outlets 224 and 226 are fluidly coupled to the downstream brake circuits 500. The level of actuation of the booster actuator 110 is commensurate with the degree of depression of the brake pedal 126. This level of actuation is determined by the electrical signal that is generated by the sensor 150 and received by the ECU 114. One sensor that may be used as sensor 150 is a potentiometer which requires connection to a rail voltage. Depression of the brake pedal 126 results in a proportional change in the received signal. As one example, the signal generated by the sensor 150 is at a maximum level when the brake pedal 126 is in a rest position. Conversely, the signal generated by the sensor 150 is at a minimum value when the brake pedal is completely depressed. Therefore, depending on the strength of the signal generated by the sensor 150, the ECU 114 determines the level of actuation of the booster actuator 110.

As described above, the booster actuator 110 is an electromechanical actuator that includes an electric motor 552 and a screw-type coupling 130 (i.e., ballscrew gear mechanism) disposed adjacent to the piston 202 of the booster assembly 108. By sensing the level of the signal generated by the sensor 150, the ECU generates corresponding signals that cause the electric motor of the booster actuator 110 to rotate a precise number of turns to effect the required amount of braking by the downstream braking circuits 500. The braking is accomplished by moving the piston 202 of the booster assembly 108 to the right in FIG. 4. The biasing element 220 applies pressure to the piston 204 which causes the piston 204 to move to the right in FIG. 4. Movement of the piston 204 compresses the biasing element 222. The more the piston 202 travels to the right, the more fluid pressure builds up in the chambers 206 and 208. Higher pressures in the chambers 206 and 208 result in higher braking in the downstream braking circuits 500.

Upon a complete or partial release of the brake pedal 126, the ECU 114 senses the change in the signal generated by the sensor 150 and in response thereto causes the motor of the booster actuator 110 to rotate in a reverse direction. The biasing elements 220 and 222, and the fluid pressure inside the chambers 206 and 208 cause the pistons 202 and 204 to move to the left in FIG. 4, thereby reducing the pressures inside the chamber 206 and 208.

Considering now the booster actuator 110' of FIG. 2C, the booster actuator 110' is operable to provide a hydraulically generated force to move the piston 202 of the booster assembly 108. Different methods can be used to govern the pressure behind the piston 202 to effect the precise amount of piston 202 travel to correspond to the degree of depression of the brake pedal 126. In this embodiment, the ECU 114 modulates a valve assembly 133 of the booster actuator 110' to allow a precise amount of pressure build up behind the piston 202. The ECU accesses a look-up table that correlates pedal travel to pressure. By modulating the valve assembly 133 between the fluid pumping station 107 and the booster assembly 108, and by monitoring the pressure, the ECU 114 controls the pressure buildup behind the piston 202. The valve assembly 133, therefore, requires a control signal from the ECU 114 on line 139, a fluid connection to the fluid pumping station 107, a fluid connection 137 to the reservoir 106, and a fluid connection 130' to the booster assembly 108.

To reduce the fluid pressures inside the chambers 206 and 208, the ECU 114 deactivates the valve assembly 133 of the booster actuator 110' and activates the valve assembly 128 to fluidly couple the chambers 206 and 208 to the reservoir 106.

In the conventional mode, the brake pedal 126 is mechanically coupled to the downstream braking circuit 500. In particular, when the brake pedal 126 is in the rest position, i.e., no pressure is being applied to the brake pedal 126 by the vehicle operator, the chambers 156 and 158 of the master cylinder assembly 102 are fluidly coupled to the reservoir 106 through inlets 162 and 164, respectively. In this position, no appreciable fluid pressure exists in the chambers 156 and 158. As the brake pedal 126 is pressed by the vehicle operator, the pistons 152 and 154 of the master cylinder assembly 102 travel and thereby seal the inlets 162 and 164. Once the inlets 162 and 164 are completely cut off from fluid communication with the chambers 156 and 158, these chambers are now only fluidly coupled to the selector valve inlets 256 and 260, the selector valve outlets 266 and 270, inlets 212 and 216, outlets 224 and 226, fluid lines 122 and 124, and the fluid connections there between. Therefore, continued depression of the brake pedal 126 raises the pressure inside the aforementioned path. It should be appreciated that in the conventional mode, the brake pedal feel simulator 104 is not fluidly coupled to the brake pedal 126.

While the brake pedal 126 is in the rest position (i.e., no pressure being applied by the vehicle operator) the chambers 206 and 208 are in fluid communication with the reservoir 106 via the valve assembly 128. Once the brake pedal 126 is pressed by the vehicle operator, the connection between the chambers 206 and 208 and the reservoir 106 is terminated by de-energizing the valve assembly 128. In the conventional mode, the booster actuator 110/110' is not actuated. Instead the required fluid pressure to effect proper braking is produced in the master cylinder assembly 102 by depression of the brake pedal 126, and is transferred to the downstream brake circuits 500 through the selector valve 112 and the booster assembly 108.

Figure 9:
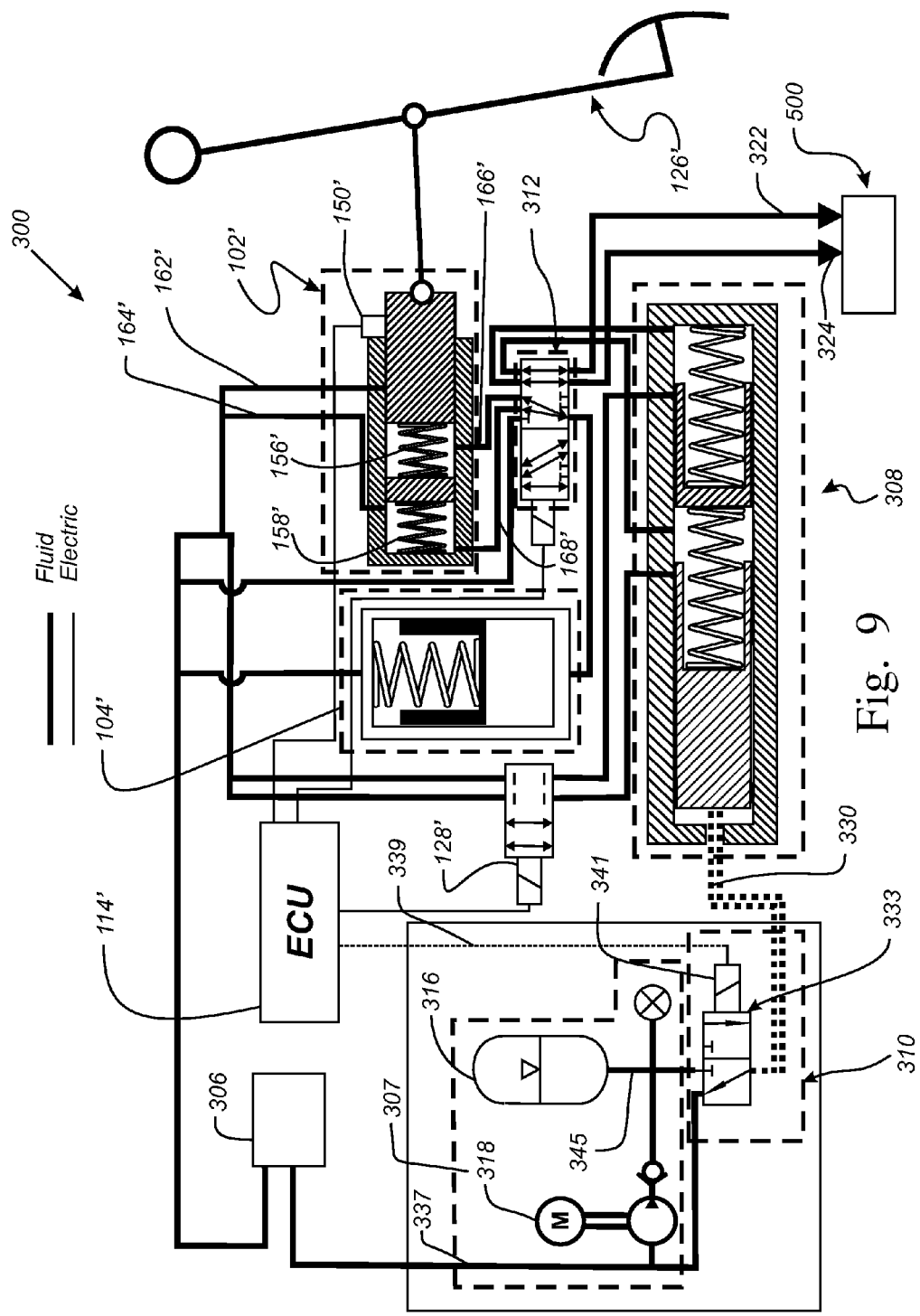
FIG. 9 depicts a schematic of an alternative embodiment of the braking system of FIG. 1 including a master cylinder, a selector valve, and a booster assembly.

Referring to FIG. 9, an alternative embodiment of a braking system 300 is depicted. The braking system 300 includes a master cylinder assembly 102', a brake pedal feel simulator 104', a reservoir 306, a booster assembly 308, a booster actuator 310, a selector valve 312, an electronic control unit (ECU) 114', and a brake pedal 126. The booster actuator 310 includes a fluid pumping station 307, a motor assembly 318 for pressurizing hydraulic fluid, a high pressure reservoir 316, and a valve assembly 333. In FIG. 9, the thin lines indicate electrical lines, while the thicker lines indicate hydraulic lines. Hydraulic lines 322 and 324 provide pressurized hydraulic fluid to downstream brake circuits 500'.

The reservoir 306 is fluidly coupled to the master cylinder assembly 102'. The master cylinder 102' is also fluidly coupled to the selector valve 312. The selector valve 312 is fluidly coupled to the brake pedal feel simulator 104'. The selector valve 312 is also fluidly coupled to the booster assembly 308. The booster assembly 308 is fluidly coupled to the reservoir 306. The coupling of the booster assembly 308 to the reservoir 306 is via a valve assembly 128' which provides selective fluid coupling between the booster assembly 308 and the reservoir 306. The booster assembly 308 is also fluidly coupled to the downstream brake circuits 500' via fluid lines 322 and 324. The ECU 114' is electrically coupled to the master cylinder assembly 102, the booster actuator 310, the selector valve 312, and the valve assembly 128'.

The booster actuator 310 is configured to provide a force to the booster assembly 308. The booster actuator 310 is coupled to a piston (402, FIG. 10) of the booster assembly 308. The force generated by the booster actuator 310 causes the piston 402 of the boost assembly 308 to move to the right in FIG. 10. Alternatively, the booster actuator 310 may be configured and operate identical to the booster actuator 110 so as to generate a force with a motor and a ball screw gear arrangement.

In the embodiment of FIG. 9, the valve assembly 333 is controlled by the ECU 114' and the coupling 330 is a fluid coupling. The booster actuator 310 is configured and operates in the same manner as the booster actuator 110', discussed above.

Figure 10:
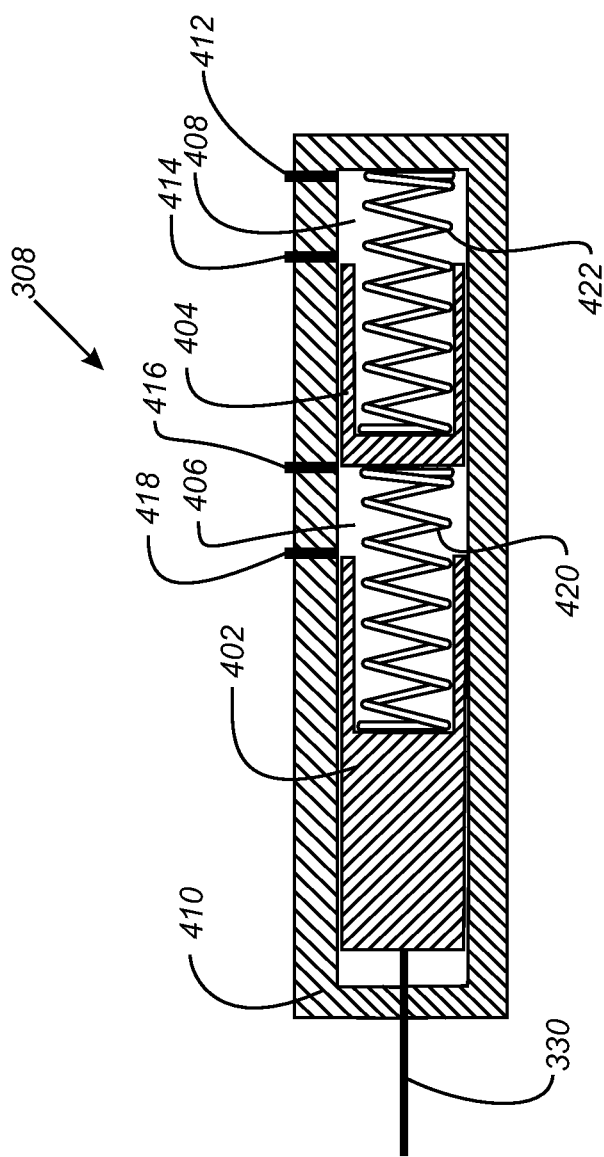
FIG. 10 depicts a cross sectional view of the booster assembly of FIG. 9.

Referring to FIG. 10, the booster assembly 308 is depicted. The booster assembly 308 includes pistons 402 and 404, a chamber 406 located between the pistons 402 and 404, a chamber 408 located between the piston 404 and a housing 410, an outlet 412 in fluid communication with the chamber 408, an inlet 414 in fluid communication with the chamber 408, an outlet 416 in fluid communication with the chamber 406, an inlet 418 in fluid communication with the chamber 406, a biasing element 420 disposed between the pistons 402 and 404 within the chamber 406, a biasing element 422 disposed between the piston 404 and the housing 410 within the chamber 408.

Figure 11:
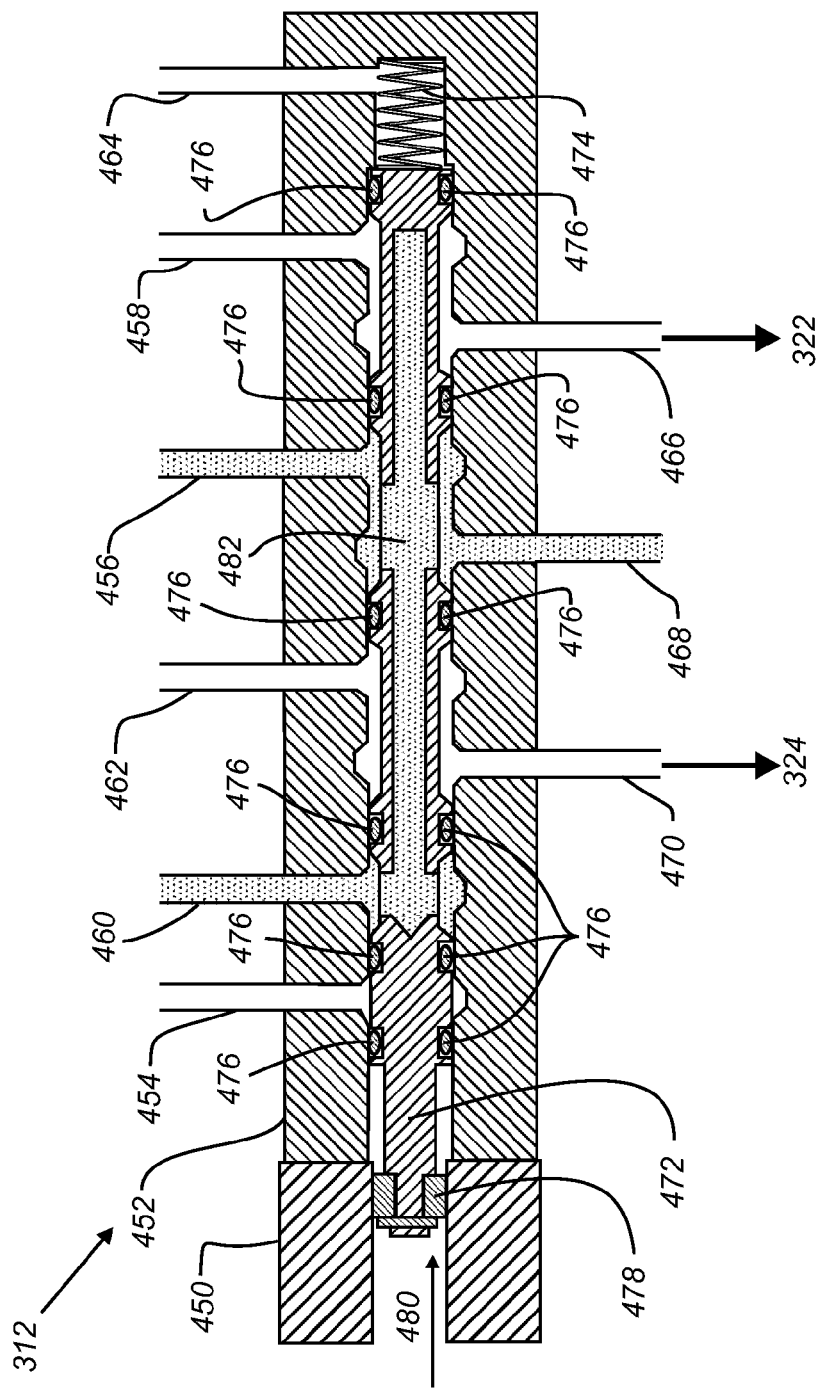
FIG. 11 depicts a cross sectional view of the selector valve of FIG. 9 including a solenoid shown in an actuated position.

Referring to FIG. 11, the selector valve 312 is depicted in further detail. The selector valve 312 includes a solenoid 450, a housing 452, inlets 454, 456, 458, 460, 462, and 464, outlets 466, 468, 470, a shaft 472, a biasing member 474 in the form of a spring disposed between the shaft 472 and the housing 452, seals 476, and a coil 478 coupled to the shaft 472. The selector valve 312 is depicted in FIG. 11 as being in an actuated position, i.e., electrical current is applied to the solenoid 450 causing the coil 478 and the shaft 472 to move to the right in the direction of an arrow 480. The activated position depicted in FIG. 11 is hereinafter referred to as the active mode.

In the active mode the selector valve 312 places the outlets of the master cylinder assembly 102 in fluid communication with the brake pedal feel simulator 104'. The shaft 472 has a hollow section 482 which allows hydraulic fluid to travel through the center of the shaft. In this position, fluid can travel from inlets 456 and 460, through the hollow section 482, and through the outlet 468. The dots inside the aforementioned path in FIG. 11 indicate presence of pressurized hydraulic fluid. The inlets 456 and 460 are connected to outlets 166' and 168' of the master cylinder assembly 102', respectively as shown in FIG. 9. Fluid that is ejected through the outlets 166' and 168' of the master cylinder assembly 102' travel through the inlets 456 and 460, through the hollow section 482 of the shaft 472 and unite in the outlet 468. The outlet 468 is fluidly connected to the brake pedal feel simulator 104 as shown in FIG. 9. The inlets 454 and 464 are fluidly coupled to the reservoir 306. The inlets 458 and 462 are connected to the outlets 412 and 416 of the booster assembly 308.

Figure 12:
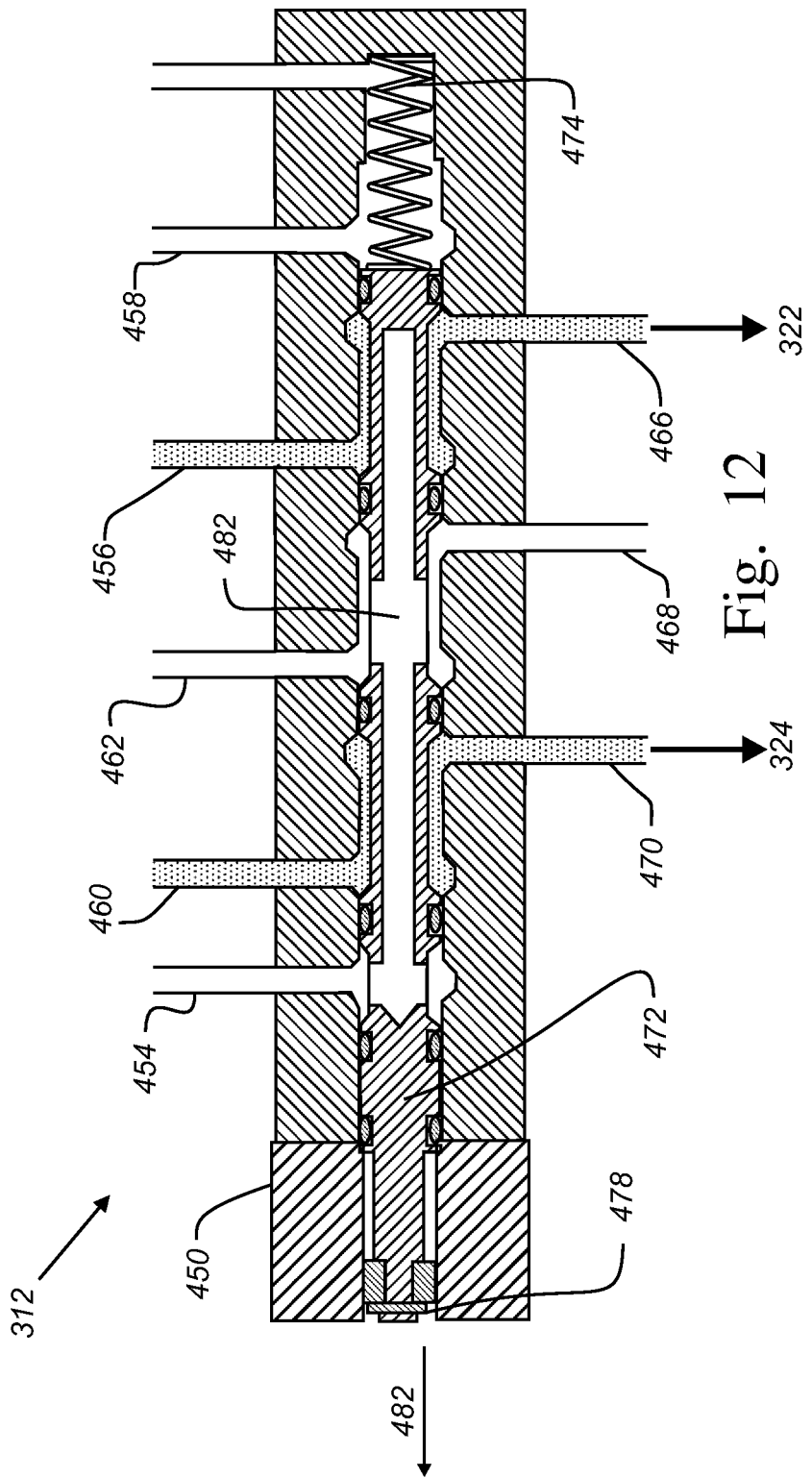
FIG. 12 depicts a cross sectional view of the selector valve of FIG. 9 with the solenoid shown in a de-actuated position.

FIG. 12 shows the selector valve 312 positioned in a de-actuated position, i.e., electrical current is not applied to the solenoid 450. The biasing member 474 causes the coil 478 and the shaft 472 to move to the left in the direction of an arrow 482 relative to its position in FIG. 11. In the de-actuated position, the selector valve 312 couples the outlets 166' and 168' of the master cylinder assembly 102' to the downstream brake circuits 500 via fluid lines 322 and 324 through the selector valve 312. This position constitutes a second mode of operation, which is hereinafter referred to as the conventional mode. In this position fluid can travel from inlets 456 and 460 and through the outlets 466 and 470. The dots inside the aforementioned path indicate presence of pressurized hydraulic fluid. The inlets 456 and 460 are connected to outlets 166' and 168' of the master cylinder assembly 102', respectively as shown in FIG. 9. Fluid that is ejected through the outlets 166' and 168' of the master cylinder assembly 102' travel through the inlets 456 and 460, and through outlets 466 and 470. The outlets 466 and 470 are fluidly connected to the downstream brake circuits 500. In the conventional mode, the hollow section 482 of the shaft 472 is isolated from fluid communication of the master cylinder assembly 102'.

Figure 13:
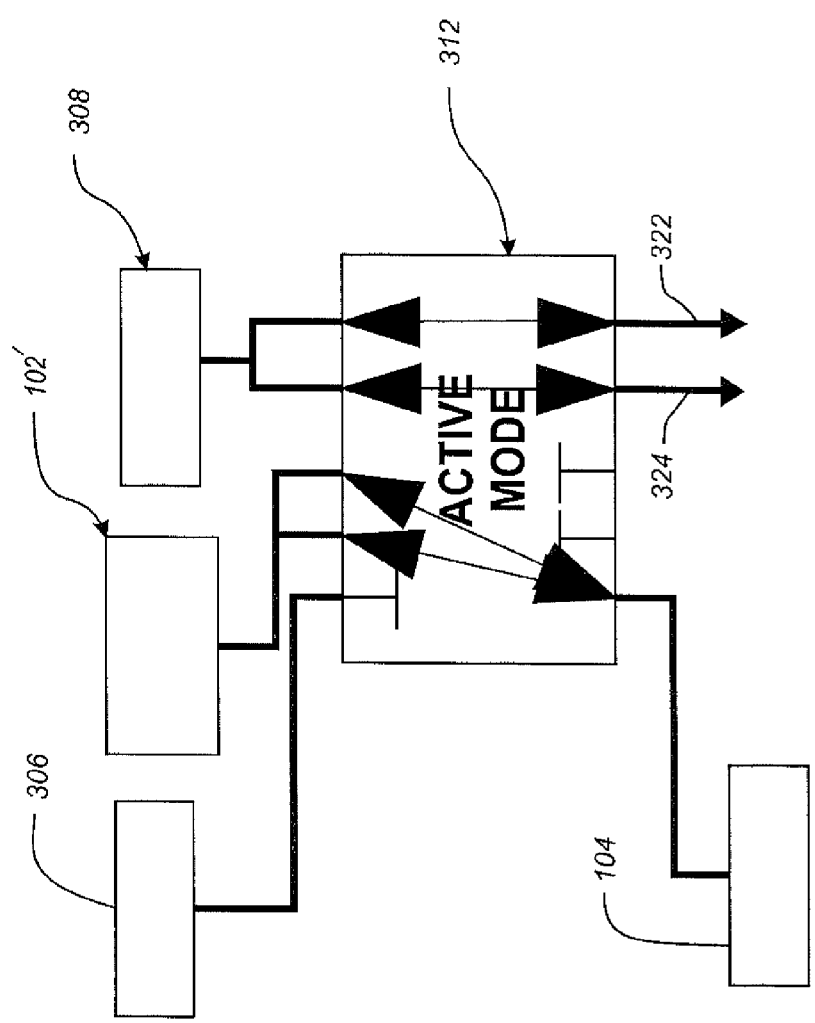
FIG. 13 depicts a schematic of the selector valve of FIG. 9 shown in a first mode.

Referring to FIG. 13, a schematic of the selector valve 312 and surrounding components is depicted with selector valve positioned in the active mode. The selector valve 312 is depicted with fluid connections showing operations in the active mode, in which the master cylinder assembly 102' is in fluid communication with the brake pedal feel simulator 104, but is isolated from the downstream brake circuits 500'. Further, in the active mode, the booster assembly 308 is in fluid communication with the downstream brake circuits 500', but is fluidly isolated from the master cylinder assembly 102'. In the active mode, the selector valve 312 is also fluidly coupled to the reservoir 306.

Figure 14:
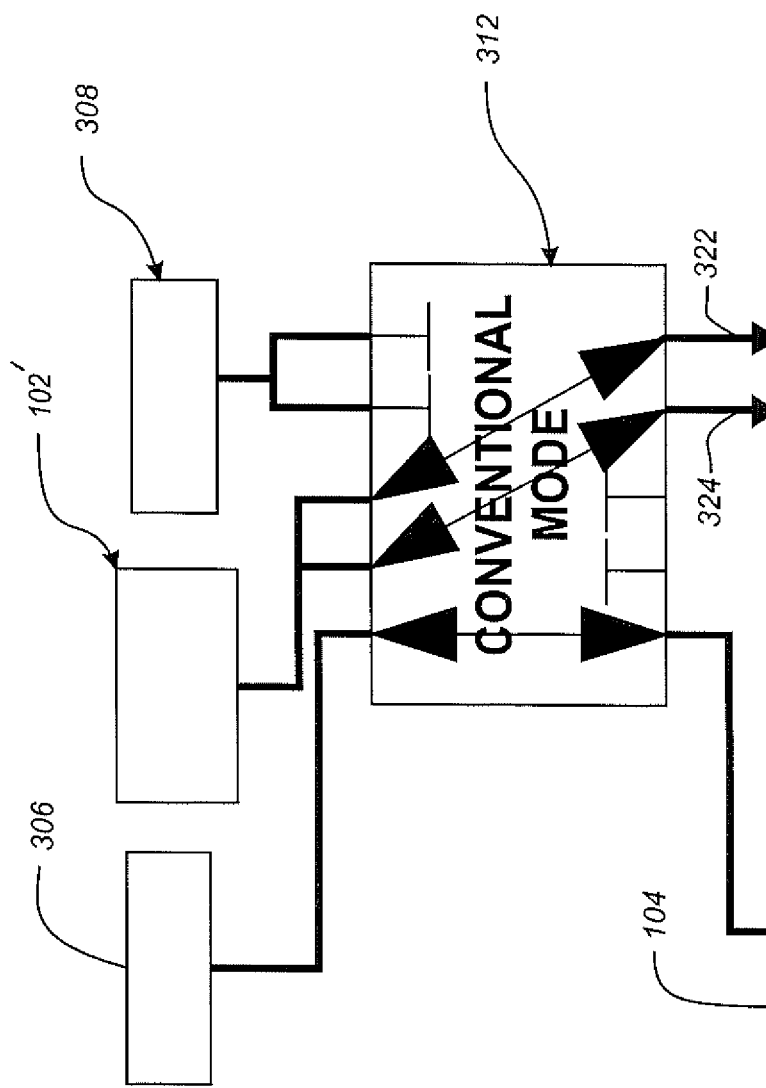
FIG. 14 depicts a schematic of the selector valve of FIG. 9 shown in a second mode.

Referring to FIG. 14, a schematic of the selector valve 312 and surrounding components is depicted with the selector valve positioned in the conventional mode. The selector valve 312 is depicted with fluid connections showing operations in the conventional mode in which the master cylinder assembly 102' is in fluid communication with the downstream brake circuits 500' through the selector valve 312 and the booster assembly 308 via fluid lines 322 and 324. In the conventional mode, the selector valve 312 is also fluidly coupled to the reservoir 306.

In operation, the ECU 114' determines the mode of the selector valve 312, i.e., active or conventional. The ECU 114' is configured to make this decision based on the fluid pressure and other diagnostic information, as is well known to one skilled in the art. The ECU 114' generates a selector signal that is used to place the selector valve 312 in one of the two modes. In the active mode, the brake pedal 126' is mechanically decoupled from the downstream brake circuits 500'. When the brake pedal 126' is in a rest position, i.e., no pressure is being applied to the brake pedal 126' by the vehicle operator, chambers 156' and 158' of the master cylinder assembly 102' are fluidly coupled to the reservoir 306 through inlets 162' and 164', respectively. In this position, no appreciable fluid pressure exists in the chambers 156' and 158'. As the brake pedal 126' is pressed by the vehicle operator, pistons of the master cylinder assembly 102' travel and thereby seal the inlets 162' and 164'. Once the inlets 162' and 164' are completely cut off from fluid communication with the chambers 156' and 158', these chambers are now only fluidly coupled to the selector valve inlets 456 and 460, the hollow section 482 of the shaft 472, the outlet 468, the brake pedal feel simulator 104' and the fluid lines there between. Therefore, continued depression of the brake pedal 126' raises the pressure inside the aforementioned path. The brake pedal feel simulator 104' provides a resistance to the brake pedal 126' similar to a conventional braking system (e.g., a resistance similar to that experienced by the vehicle operator when the selector valve is positioned in the conventional mode).

Furthermore, in the active mode the combination of seals 476, the shaft 472, and the housing 452 of the selector valve 312 prevents any appreciable fluid communication between the master cylinder assembly 102' and the booster assembly 308. Therefore, the master cylinder assembly 102' is isolated from fluid communication with the booster assembly 308 when the selector valve is positioned in the active mode.

While the brake pedal 126' is in a rest position, i.e., no pressure being applied by the vehicle operator, the chambers 406 and 408 are in fluid communication with the reservoir 306 via the valve assembly 128'. The valve assembly 128' can be a normally closed valve assembly, thereby requiring energization of its solenoid in order to establish fluid coupling between its inlets and outlets. Therefore, while the brake pedal 126' is in the rest position, the valve assembly 128' can be intermittently energized in order to maintain fluid coupling between the chambers 406 and 408 and the reservoir 306. Once the brake pedal 126' is pressed by the vehicle operator, the connection between the chambers 406 and 408 and the reservoir 306 is terminated by de-energizing the valve assembly 128'.

In the active mode when the booster actuator 310 is actuated, fluid pressure inside the chambers 406 and 408 begins to rise. The outlets 412 and 416 are fluidly coupled to the inlets 458 and 462 of the selector valve 312. The level of actuation of the booster actuator 310 is commensurate with the degree of depression of the brake pedal 126'. This level of actuation is determined by the electrical signal that is generated by a sensor 150' and received by the ECU 114'. One sensor that may be used as sensor 150' is a potentiometer. Depression of the brake pedal 126' results in a proportional change in the received signal. As one example, the signal generated by the sensor 150' is at a maximum level when the brake pedal 126' is in a rest position. Conversely, the signal generated by the sensor 150' is at a minimum value when the brake pedal is completely depressed. Therefore, depending on the strength of the signal generated by the sensor 150', the ECU 114' determines the level of actuation of the booster actuator 110.

The booster actuator 310 is operable to provide a hydraulically generated force to move the piston 402 of the booster assembly 308. Different methods can be used to govern the pressure behind the piston 402 to effect the precise amount of piston travel 402 to correspond to the degree of depression of the brake pedal 126'. The ECU 114' modulates a valve assembly 333 of the booster actuator 310 to allow a precise amount of pressure build up behind the piston 402. The ECU 114' accesses a look-up table that correlates pedal travel to pressure. By modulating the valve assembly 333 between the fluid pumping station 307 and the booster assembly 308, and by monitoring the pressure, the ECU 114' controls the pressure buildup behind the piston 402. The valve assembly 333, therefore, requires a control signal from the ECU 114' on line 339 which is connected to a solenoid valve 341, a fluid connection 345 to the high pressure reservoir 316, a fluid connection 337 to the reservoir 306, and a fluid connection 330 to the booster assembly 308.

In the conventional mode, the brake pedal 126' is mechanically coupled to the downstream braking circuit 500'. In particular, when the brake pedal 126' is in the rest position, i.e., no pressure is being applied to the brake pedal 126' by the vehicle operator, the chambers 156' and 158' of the master cylinder assembly 102' are fluidly coupled to the reservoir 306 through inlets 162' and 164', respectively. In this position, no appreciable fluid pressure exists in the chambers 156' and 158'. As the brake pedal 126'is pressed by the vehicle operator, the pistons of the master cylinder assembly 102' travel and thereby seal the inlets 162 and 164. Once the inlets 162 and 164 are completely cut off from fluid communication with the chambers 156' and 158', these chambers are now only fluidly coupled to the selector valve inlets 456 and 460, the selector valve outlets 466 and 470, fluid lines 322 and 324, and the fluid connections there between. Therefore, continued depression of the brake pedal 126' raises the pressure inside the aforementioned path. It should be appreciated that in the conventional mode, the brake pedal feel simulator 104' is not fluidly coupled to the master cylinder assembly 102'.

While the brake pedal 126' is in the rest position (i.e., no pressure being applied by the vehicle operator) the chambers 406 and 408 are in fluid communication with the reservoir 306 via the valve assembly 128'. Once the brake pedal 126' is pressed by the vehicle operator, the connection between the chambers 406 and 408 and the reservoir 306 is terminated by de-energizing the valve assembly 128'. In the conventional mode, the booster actuator 310 is not actuated. Instead the required fluid pressure to effect proper braking is produced in the master cylinder assembly 102' by depression of the brake pedal 126', and is transferred to the downstream brake circuits 500' through the selector valve 312 and the booster assembly 308.

Figure 15:
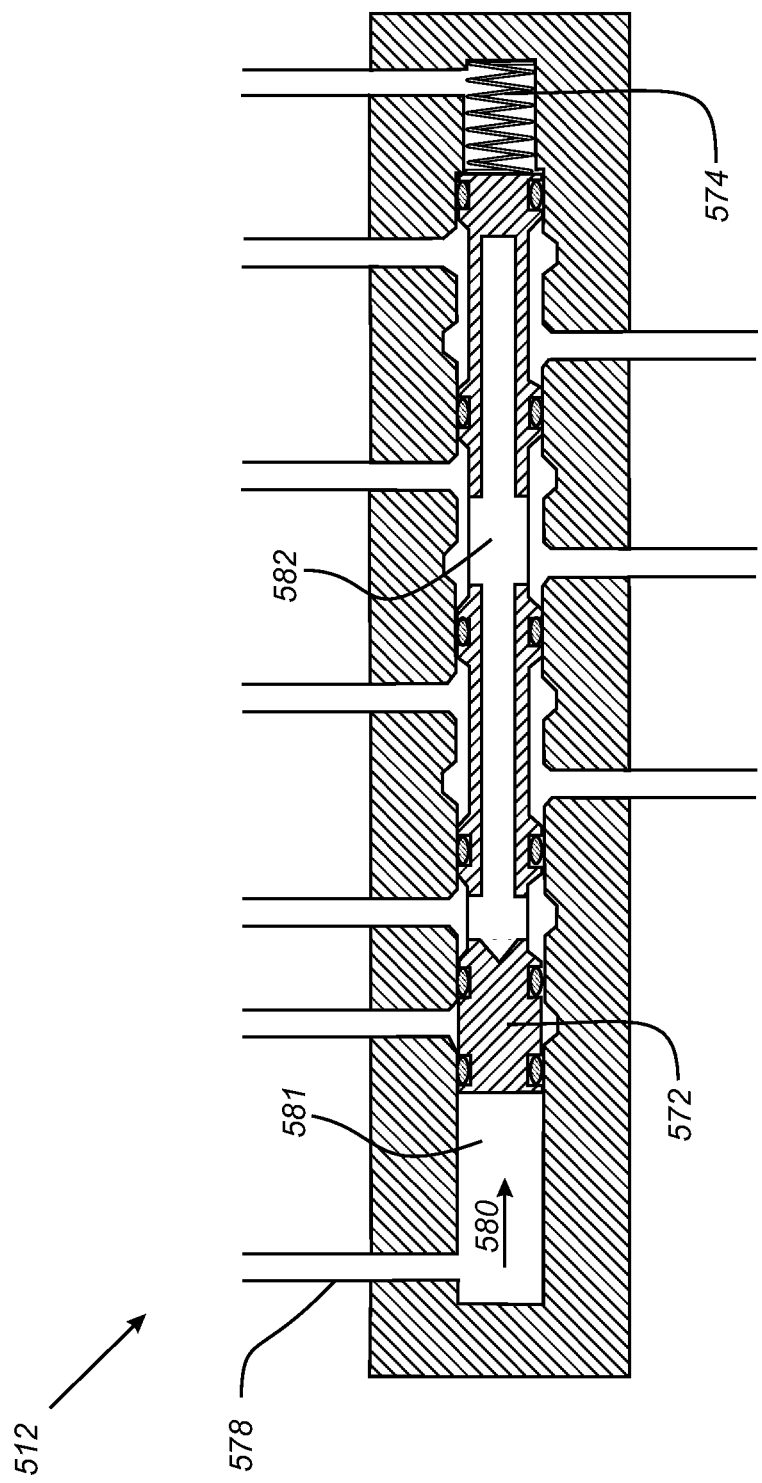
FIG. 15 depicts a cross sectional view of an alternative embodiment of the selector valve of FIG. 9 configured to be actuated hydraulically, with the selector valve shown in an actuated position.

Referring to FIG. 15, an alternative embodiment of a selector valve 512 is depicted. The selector valve 512 is similar to the selector valve 312 with the following differences. The coil 478 and the solenoid 450 are replaced with a fluid inlet 578 that is fluidly coupled to a source of pressurized fluid (e.g., the pumping station 307) to effect movement of a shaft 572 in the direction of an arrow 580. A hollow section 582 is also present in the selector valve 512, similar to the hollow section 482 depicted in the selector valve 312. An electrically actuated valve (not shown) can be used to selectively place a chamber 581 behind the shaft 572 in fluid communication with the source of the pressurized fluid to cause the shaft to move to the right in the direction of the arrow 580. This actuated position (shown in FIG. 15) places the selector valve 512 in the active mode. The electrically actuated valve is actuated and deactuated by the ECU 114'.

The electrically actuated valve is also configured to couple the chamber 581 to the reservoir 306 to relieve the pressure that has built up in the chamber 581. A biasing member 574 in the form of a spring is configured to return the shaft 572 to a rest position. This position places the selector valve 512 in the conventional mode. It should be appreciated that the selector valve 512 as depicted in FIG. 15 can be used in place of the selector valve 312 as that depicted in FIG. 2 and the selector valve 312 in FIG. 9.

Figure 16:
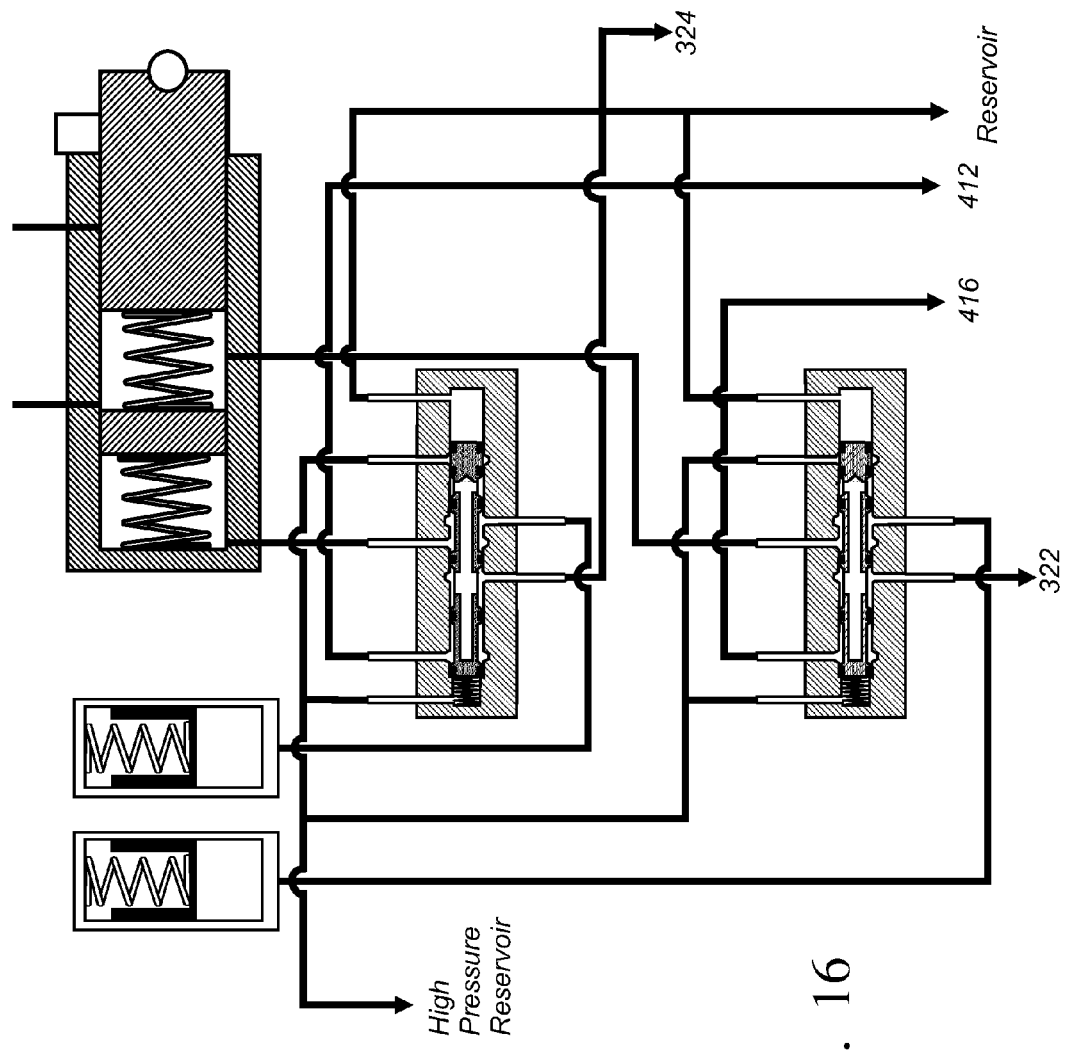
FIG. 16 depicts a schematic of another alternative embodiment of the braking system of FIG. 1 which includes two selector valves and two brake pedal feel simulators.

Referring to FIG. 16, an alternative to the selector valves 112, 312, and 512 is shown. In particular, a selector valve assembly including two selector valves components is shown. The two selector valve components are coupled to one booster assembly, and each individual selector valve member is coupled to a separate brake pedal feel simulator. In the embodiment that is shown in FIG. 16, each selector valve member is coupled to a downstream braking circuit 502 and 504, respectively. In yet another alternative embodiment, each selector valve member can be coupled to an inlet 212 and 216 of the booster assembly 108, in a manner similar to that depicted in FIG. 2. One advantage of dividing the functionality of the selector valve assembly into two selector valves components is to increase safety. With two selector valve components, if one of the two selector valve components fails, the other selector valve component can continue to provide a braking function to its respective downstream braking circuit (such as braking circuit 502 and 504). As described above, each selector valve component can be actuated by electrically actuated solenoid valves or by application of high pressure fluid from a source of high pressure fluid to a chamber behind the shafts of the selector valve components (such as chamber 580 in FIG. 15).

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

We claim:

1. A system for use in a vehicle with a brake pedal and a brake circuit, comprising:
   a master cylinder assembly configured to pressurize fluid therein in response to movement of said brake pedal;
   a sensor assembly configured to generate a pedal position signal indicative of position of said brake pedal;
   an electronic control unit configured to (i) generate a brake request signal in response to generation of said pedal position signal, and (ii) generate a selector control signal;
   a selector valve assembly operable in a first mode and a second mode, said selector valve assembly being moved from said first mode to said second mode in response to generation of said selector control signal;
   a pedal feel simulator (i) in fluid communication with said master cylinder when said selector valve assembly is positioned in said first mode, and (ii) isolated from fluid communication with said master cylinder when said selector valve assembly is positioned in said second mode;
   a booster actuator configured to generate a force in response to generation of said brake request signal; and
   a booster assembly configured to pressurize fluid therein in response to generation of said force by said booster actuator,
   wherein said master cylinder assembly is (i) isolated from fluid communication with said brake circuit when said selector valve assembly is positioned in said first mode, and (ii) in fluid communication with said brake circuit when said selector valve assembly is positioned in said second mode, and
   wherein said booster assembly is (i) in fluid communication with said brake circuit when said selector valve assembly is positioned in said first mode, and (ii) isolated from fluid communication with said brake circuit when said selector valve assembly is positioned in said second mode,
   said selector valve assembly includes a valve component having a housing and a selector valve member within said housing,
   said housing defines a first selector valve fluid inlet, a second selector valve fluid inlet, and a selector valve fluid outlet, and
   said selector valve member defines therein a fluid passage,
   said first selector valve fluid inlet is in fluid communication with said selector valve fluid outlet through said fluid passage when said selector valve assembly is positioned in said first mode, and
   said second selector valve fluid inlet is isolated from said selector valve fluid outlet when said selector valve assembly is positioned in said first mode.

2. The system of claim 1, wherein:
   said master cylinder assembly includes a master cylinder housing and a master cylinder piston located within said master cylinder housing, and
   movement of said brake pedal causes said master cylinder piston to move within said master cylinder housing.

3. The system of claim 2, wherein:
   said booster assembly includes a booster housing and a booster piston located within said booster housing, and
   generation of said force by said booster actuator causes said booster piston to move within said booster housing.

4. The system of claim 3, wherein:
   said master cylinder housing includes a master cylinder fluid outlet,
   said selector valve housing further defines a second selector valve fluid outlet,
   said booster housing includes a booster fluid inlet and a booster fluid outlet,
   said master cylinder fluid outlet is in fluid communication with said first selector valve fluid inlet,
   said booster fluid outlet is in fluid communication with said second selector valve fluid inlet,
   said selector valve fluid outlet is in fluid communication with a fluid inlet of said brake circuit, and
   said second selector valve fluid outlet is in fluid communication with a second fluid inlet of said brake circuit.

5. The system of claim 1, wherein said electronic control unit generates said brake request signal and said selector control signal in response to a pressure sensor detecting a hydraulic fluid pressure value below a predetermined value.

6. The system of claim 1, wherein:
   said master cylinder assembly includes a master cylinder housing, a first master cylinder piston located within said master cylinder housing, a second master cylinder piston located within said master cylinder housing,
   movement of said brake pedal causes said first master cylinder piston and said second master cylinder piston to move within said master cylinder housing.

7. The system of claim 6, wherein:
   said booster assembly includes a booster housing, a first booster piston located within said booster housing, and a second booster piston located within said booster housing,
   generation of said force by said booster actuator causes said first booster piston and said second booster piston to move within said booster housing.

8. The system of claim 1, further comprising a fluid reservoir coupled to said master cylinder, said pedal feel simulator, said selector valve housing, and said booster assembly.

9. The system of claim 1, wherein said booster actuator includes:
   a motor which operates in response to generation of said brake request signal, and
   an actuator member which moves in response to operation of said motor, said force being generated in response to movement of said actuator member.

10. The system of claim 1, wherein said booster actuator includes:
    a pump for pressurizing fluid within a station, and
    a booster valve positionable in a closed mode and an open mode,
    wherein said booster valve is moved from said closed mode to said open mode in response to generation of said brake request signal, and
    wherein said force is generated in response to said pressurized fluid being advanced out of said station through said booster valve when said booster valve is located in said open mode.

11. The system of claim 1, wherein said selector valve assembly includes a solenoid which is configured to move said selector valve member from said first mode to said second mode in response to generation of said selector control signal.

12. The system of claim 11, wherein:
    said selector valve assembly further includes a spring, and said selector valve member is moved from said second mode to said first mode by said spring upon termination of said selector control signal.

13. The system of claim 1, wherein:
said selector valve housing assembly includes a fluid input separate from said first and second selector valve fluid inlets, and
said selector valve member is moved from said first mode to said second mode in response to receipt of high pressure fluid at said fluid input.

14. The system of claim 13, wherein:
said selector valve assembly further includes a spring, and
said selector valve member is moved from said second mode to said first mode by said spring upon removal of said high pressure fluid at said fluid input.

15. A system for use in a vehicle with a brake pedal and a brake circuit, comprising:
a master cylinder assembly configured to pressurize fluid therein in response to movement of said brake pedal;
a sensor assembly configured to generate a pedal position signal indicative of position of said brake pedal;
an electronic control unit configured to (i) generate a brake request signal in response to generation of said pedal position signal, and (ii) generate a selector control signal;
a selector valve assembly operable in a first mode and a second mode, said selector valve assembly being moved from said first mode to said second mode in response to generation of said selector control signal;
a pedal feel simulator (i) in fluid communication with said master cylinder when said selector valve assembly is positioned in said first mode, and (ii) isolated from fluid communication with said master cylinder when said selector valve assembly is positioned in said second mode;
a booster actuator configured to generate a force in response to generation of said brake request signal; and
a booster assembly configured to pressurize fluid therein in response to generation of said force by said booster actuator,
wherein said master cylinder assembly is (i) isolated from fluid communication with said brake circuit when said selector valve assembly is positioned in said first mode, and (ii) in fluid communication with said brake circuit when said selector valve assembly is positioned in said second mode, and
wherein said booster assembly is (i) in fluid communication with said brake circuit when said selector valve assembly is positioned in said first mode, and (ii) isolated from fluid communication with said brake circuit when said selector valve assembly is positioned in said second mode,
a first selector valve subassembly coupled between said master cylinder assembly and said booster assembly, and
a second selector valve subassembly coupled between said master cylinder assembly and said booster assembly, wherein
said pedal feel simulator includes a first pedal feel simulator subsystem and a second pedal feel simulator subsystem,
said first pedal feel simulator subsystem is (i) in fluid communication with said master cylinder via said first selector valve subassembly when said selector valve assembly is positioned in said first mode, and (ii) isolated from fluid communication with said master cylinder by said first selector valve subassembly when said selector valve assembly is positioned in said second mode, and
said second pedal feel simulator subsystem is (i) in fluid communication with said master cylinder via said second selector valve subassembly when said selector valve assembly is positioned in said first mode, and (ii) isolated from fluid communication with said master cylinder by said second selector valve subassembly when said selector valve assembly is positioned in said second mode.

* * * * *